US012045955B2

United States Patent
Sharifi et al.

(10) Patent No.: US 12,045,955 B2
(45) Date of Patent: Jul. 23, 2024

(54) CONDITION-AWARE GENERATION OF PANORAMIC IMAGERY

(71) Applicant: GOOGLE LLC, Mountain View, CA (US)

(72) Inventors: Matthew Sharifi, Mountain View, CA (US); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 334 days.

(21) Appl. No.: 17/273,063

(22) PCT Filed: Sep. 2, 2020

(86) PCT No.: PCT/US2020/049001
§ 371 (c)(1),
(2) Date: Mar. 3, 2021

(87) PCT Pub. No.: WO2022/050937
PCT Pub. Date: Mar. 10, 2022

(65) Prior Publication Data
US 2022/0301129 A1    Sep. 22, 2022

(51) Int. Cl.
*G06T 5/50* (2006.01)
*G06T 3/00* (2006.01)
(Continued)

(52) U.S. Cl.
CPC .................. *G06T 5/50* (2013.01); *G06T 3/00* (2013.01); *G06V 10/74* (2022.01); *G06V 10/764* (2022.01);
(Continued)

(58) Field of Classification Search
CPC ... G06T 5/50; G06T 3/00; G06T 2207/20081; G06T 2207/20084; G06T 2207/20221;
(Continued)

(56) References Cited

U.S. PATENT DOCUMENTS 10,424,087 B2    9/2019   Risser
10,726,304 B2    7/2020   Hotson et al.
(Continued)

FOREIGN PATENT DOCUMENTS

EP    3 410 404 A1    12/2018
JP    2018-054456 A    4/2018
(Continued)

OTHER PUBLICATIONS

Fujun Luan, Sylvain Paris, Eli Shechtman, and Kavita Bala, "Deep Photo Style Transfer," arXiv:1703.07511v3, pp. 1-9, 2017.
(Continued)

*Primary Examiner* — Xuemei G Chen
(74) *Attorney, Agent, or Firm* — MARSHALL, GERSTEIN & BORUN LLP

(57) ABSTRACT

System and methods are provided for generating panoramic imagery. An example method may be performed by one or more processors and includes obtaining first panoramic imagery depicting a geographic area. The method also includes obtaining an image depicting one or more physical objects absent from the first panoramic imagery. Further, the method includes transforming the first panoramic imagery into second panoramic imagery depicting the one or more physical objects and including at least a portion of the first panoramic imagery.

20 Claims, 9 Drawing Sheets

(51) Int. Cl.
*G06V 10/74* (2022.01)
*G06V 10/764* (2022.01)
*G06V 10/774* (2022.01)
*G06V 10/82* (2022.01)

(52) U.S. Cl.
CPC ............ *G06V 10/774* (2022.01); *G06V 10/82* (2022.01); *G06T 2207/20081* (2013.01); *G06T 2207/20084* (2013.01); *G06T 2207/20221* (2013.01)

(58) Field of Classification Search
CPC .... G06V 10/74; G06V 10/764; G06V 10/774; G06V 10/82; G06V 10/25; G06F 18/2413; G06F 18/25; G06N 3/045; G06N 3/08
See application file for complete search history.

(56) References Cited

U.S. PATENT DOCUMENTS

| | | | | |
|---|---|---|---|---|
| 2015/0358612 | A1* | 12/2015 | Sandrew | H04N 13/261 348/47 |
| 2018/0130243 | A1* | 5/2018 | Kim | G06T 3/0062 |
| 2018/0240223 | A1* | 8/2018 | Yi | G06T 3/00 |
| 2019/0228571 | A1* | 7/2019 | Atsmon | G05D 1/0088 |
| 2019/0244329 | A1 | 8/2019 | Li et al. | |
| 2019/0251401 | A1 | 8/2019 | Shechtman et al. | |
| 2020/0379481 | A1* | 12/2020 | Newman | G06V 20/56 |
| 2021/0326634 | A1* | 10/2021 | Zheng | G06N 3/04 |
| 2021/0342586 | A1* | 11/2021 | Fleisig | G06V 20/182 |

FOREIGN PATENT DOCUMENTS

| | | |
|---|---|---|
| JP | 2018-513441 A | 5/2018 |
| WO | WO-2018/002910 A1 | 1/2018 |

OTHER PUBLICATIONS

Muthuraman Chidambaram & Yanjun Qi, "Style Transfer Generative Adversarial Net-Works: Learning to Play Chess Differently," arXiv:1702.06762v2, pp. 1-6, 2017.

Leon A. Gatys, Alexander S. Ecker, and Matthias Bethge, "Image Style Transfer Using Convolutional Neural Networks," *Proceedings of the IEEE conference on computer vision and pattern recognition*, pp. 2414-2423, 2016.

"Generative Adversarial Network," Wikipedia (2020).

International Search Report and Written Opinion for Application No. PCT/US2020/049001, dated May 3, 2021.

Notice of Reasons for Rejection for Japanese Application No. 2023-514805, dated Apr. 1, 2024.

* cited by examiner

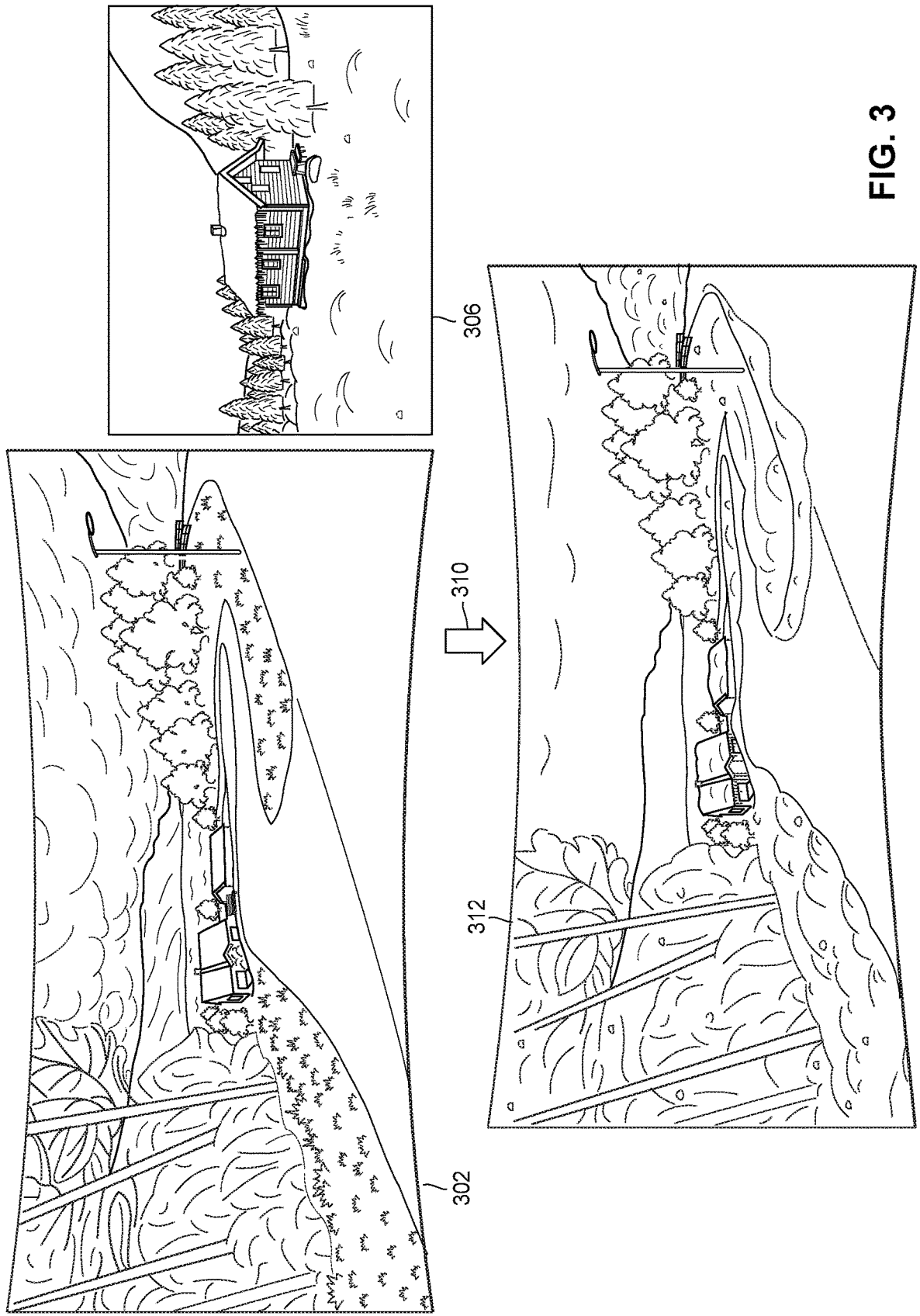

CONDITION-AWARE GENERATION OF PANORAMIC IMAGERY

FIELD OF THE DISCLOSURE

The present disclosure relates to panoramic imagery and, more particularly, to generating panoramic imagery based on the content of other images.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, users access panoramic imagery from geographic services that provide panoramic or "360" views of various geographic locations. Users can also navigate through a series of images in order to virtually explore the location, if such a series of images is available. For example, users can virtually "drive" or "walk" down a road or a street and view the surrounding approximately from the vantage point of a driver or pedestrian. However, existing panoramic imagery reflects only the conditions of the geographic location at the time the imagery was captured. For example, panoramic imagery may depict a certain location only in July under sunny conditions, even when users view the panoramic imagery for this location in January under snowy conditions.

Further, some locations are remote or otherwise difficult to reach for vehicles equipped with specialized cameras or camera arrays. As a result, panoramic imagery is updated only infrequently, and some of the changes to the environment are not reflected in the imagery for a long time.

SUMMARY

A first aspect of the techniques of this disclosure is a method for generating panoramic imagery. The method may be performed by one or more processors and includes obtaining first panoramic imagery depicting a geographic area. The method also includes obtaining an image depicting one or more physical objects absent from the first panoramic imagery. In other words, the one or more physical objects depicted in the image are not depicted in the first panoramic imagery. Further, the method includes transforming the first panoramic imagery into second panoramic imagery depicting the one or more physical objects and including at least a portion of the first panoramic imagery. This provides a technical effect of generating new images based on existing panoramic imagery and other imagery. Specifically, new panoramic images depicting geographic areas can be generated by transforming existing panoramic images. The existing panoramic images are transformed such that the image depicts features not previously depicted in the existing panoramic image, thus resulting in a new panoramic image. Such new features are obtained from other images. In some embodiments, these images are non-panoramic images. Thus, new panoramic imagery depicting a geographical area can be obtained based on existing panoramic imagery and other existing imagery, without requiring the new panoramic imagery to be captured using specialized panoramic cameras. The new panoramic imagery may include features that were not present in the existing panoramic imagery. In other words, at the time the first panoramic image was captured, one or more features may not have been present in at the geographical area that is depicted. At a later time however, new features may be present at the geographic area (this includes previous features being removed or replaced, or new features being added). In conventional techniques, obtaining an updated panoramic image of the geographic area (depicting the new features) would require visiting the area with specialized equipment suitable for obtaining panoramic images. The present techniques however enable an updated panoramic image to be created based on already captured imagery, without requiring new panoramic imagery to be captured. In this way, an improved means for obtaining updated panoramic image is provided.

In some embodiments, the image is user-generated-content (UGC). In other words, the image depicting one or more features not present in the first panoramic image may be any form of image captured by a user. In some examples, a conventional camera can be used to capture the image, which is then used to transform the first panoramic image to obtain updated panoramic imagery. In this way, access to updated imagery is increased since the source of the first image may be a wide variety of sources (not just specialized panoramic image capturing equipment).

In some embodiments, the image depicts at least a portion of the geographic area depicted in the first panoramic imagery. In other words, the image is not an identical panoramic image to the first panoramic image (depicting an identical geographic area), but the image may depict at least a portion of the area depicted in the first panoramic imagery. This can be used to identify the location of the new features in the new panoramic image (based on the portion of the area depicted in the image).

A second aspect of the techniques of this disclosure is a method for generating panoramic imagery that may be performed by one or more processors and may include obtaining first panoramic imagery. The method also includes obtaining a non-panoramic image depicting one or more features absent from the first panoramic imagery. The method further includes applying the non-panoramic image to the first panoramic imagery in order to depict the one or more features in second panoramic imagery. In these embodiments, the one or more features depicted in the non-panoramic image are not depicted in the first panoramic imagery. Similar to the advantages described above, this enables an updated panoramic image to be created based on already captured panoramic imagery and other non-panoramic images, without requiring new panoramic imagery to be captured. In this way, a simpler means for obtaining an updated panoramic image is provided which does not require specialized equipment to capture new panoramic images.

A third aspect of the techniques of this disclosure is a computing device including processing hardware and configured to implement any of the methods described herein.

A fourth aspect of the techniques of this disclosure is a computer-readable medium (that is optionally non-transitory) carrying instructions that, when executed by one or more processors, cause the one or more processors to carry out any one of the methods disclosed herein.

BRIEF DESCRIPTION OF THE DRAWINGS

FIG. 3 illustrates an example panoramic image that may be generated using the techniques of this disclosure based on an existing panoramic image and a non-panoramic image depicting features absent from the existing panoramic image due to different environmental conditions;

DETAILED DESCRIPTION

Overview

Figure 1:
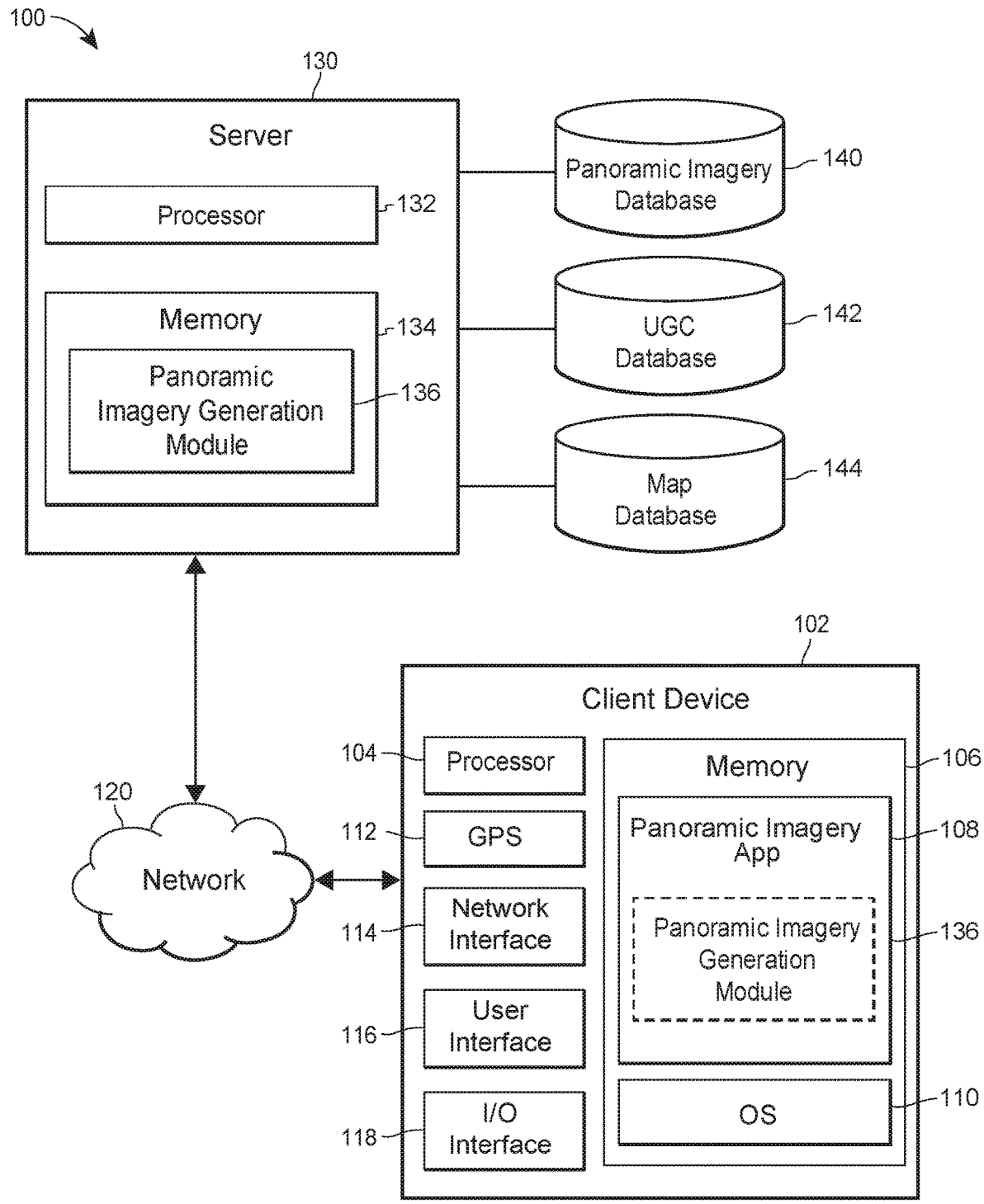
FIG. 1 illustrates a block diagram of an example system in which the techniques of this disclosure for generating panoramic imagery can be implemented.

Generally speaking, the systems and methods of the present disclosure generate new panoramic imagery for a geographic location, so that the new panoramic imagery includes features and/or objects absent from existing panoramic imagery corresponding to the same geographic location. The generated panoramic imagery can reflect user-specified conditions, and/or can be an up-to-date panoramic image that reflects changes to a location. For example, existing panoramic imagery available for a location may depict the location during the daytime, and in the summer. A user may request panoramic imagery depicting the location as the location appears at night and during the winter. The system can generate panoramic imagery depicting the location for the requested time of day and season and transmit the generated panoramic imagery to a client device for display. As another example, the system can receive non-panoramic images for a location and determine that that the location has changed in appearance relative to an existing panoramic image. The non-panoramic images may include, for example, a new storefront on a street. If a user requests panoramic imagery depicting the location, the system may generate up-to-date panoramic imagery of the location including the new storefront. Importantly, the up-to-date panoramic imagery is generated based on the already-captured images mentioned above and does not require any new imagery to be captured using image-capturing means such as a camera, specifically a panoramic camera (which may require multiple cameras).

Depending on the implementation, the system may generate new panoramic imagery based on existing panoramic imagery and "source" panoramic or non-panoramic images depicting features or objects not present in the existing panoramic imagery. The source images may depict at least a portion of the same geographic location as the existing panoramic imagery, or a different geographic location. The system may generate the panoramic imagery using a machine learning model. In some implementations, the system can utilize a generative adversarial network to generate panoramic imagery and evaluate the quality of the generated panoramic imagery (i.e., whether the generated panoramic imagery would be perceived by a human as real or generated). In this way, a generative adversarial network (GAN) is used in the specific technical application of generating and evaluating panoramic imagery depicting geographical areas. In other words, the GAN as disclosed serves a technical purpose of generating and evaluating panoramic imagery depicting a geographical area.

Users can specify what conditions the generated panoramic imagery should include. For example, user-specified conditions may include a weather condition (e.g., snowy, rainy, foggy, cloudy, sunny, etc.), a time of day or amount of daylight (e.g., sunrise, daytime, sunset, night, etc.), a season (e.g., summer, spring, fall, winter, etc.), a crowd level (e.g., crowded, no pedestrians, etc.), a natural disaster (e.g., flooded, post-fire, post-earthquake, etc), an up-to-date view, or the like. Using the techniques of this disclosure, a system can generate panoramic imagery depicting any user-specified conditions and/or changes to a geographic location without the need for capturing new panoramic imagery depicting the actual conditions and/or changes at the geographic location. In this way, accessibility to various types of imagery is improved since such images depicting different conditions or features are readily obtained without requiring images to actually be captured that depict those conditions or features. It is also possible to generate such images in response to a request from a user (as described in more detail below). In these embodiments, the images may only be generated in response to the user's request, rather than being stored and retrieved in response to the request. In this way, the technical effect of improving use of storage space is achieved, since various images accessible by a user do not take up corresponding amounts of storage (they are temporarily created in real-time when requested). When a user no longer requires that image, it may be deleted from temporary storage, thereby avoiding the need to store extraneous amounts of data for images depicting geographic areas under different conditions.

Example Hardware and Software Components

Referring first to FIG. 1, an example panoramic imagery generation system 100 includes a client computing device 102 (also referred to herein as a "client device") coupled to a panoramic imagery generation server 130 (also referred to herein as "server 130") via a network 120. The network 120 in general can include one or more wired and/or wireless communication links and may include, for example, a wide area network (WAN) such as the Internet, a local area network (LAN), a cellular telephone network, or another suitable type of network.

The client device 102 may be a portable device such as a smart phone or a tablet computer, for example. The client device 102 may also be a laptop computer, a desktop computer, a personal digital assistant (PDA), a wearable device such as a smart glasses, or other suitable computing device. The client device 102 may include a memory 106, one or more processors (CPUs) 104, a global positioning system (GPS) module 112 or another suitable positioning module, a network interface 114, a user interface 116, and an input/output (I/O) interface 118. The client device 102 may also include components not shown in FIG. 1, such as a graphics processing unit (GPU).

The network interface 114 may include one or more communication interfaces such as hardware, software, and/or firmware for enabling communications via a cellular network, a WiFi network, or any other suitable network such as the network 120. The user interface 116 may be configured to provide information, such as panoramic imagery, to the user. The I/O interface 118 may include various I/O components (e.g., ports, capacitive or resistive touch sensitive input panels, keys, buttons, lights, LEDs). For example, the I/O interface 118 may be a touch screen.

The memory 106 may be a non-transitory memory and may include one or several suitable memory modules, such as random access memory (RAM), read-only memory (ROM), flash memory, other types of persistent memory, etc. The memory 106 may store machine-readable instructions executable on the one or more processors 104 and/or special processing units of the client device 102. The memory 106 also stores an operating system (OS) 110, which can be any suitable mobile or general-purpose OS. In addition, the memory can store one or more applications that communicate data via the network 120, including a panoramic imagery application 108. Communicating data can include transmitting data, receiving data, or both. The OS 110 may include application programming interface (API) functions that allow applications to access information from the GPS module 112 or other components of the client device 102. For example, the panoramic imagery application 108 can include instructions that invoke an OS 110 API for retrieving a current geographic location of the client device 102.

Depending on the implementation, the panoramic imagery application 108 can display panoramic imagery of geographic locations, provide user-controls for exploring geographic locations by navigating through panoramic imagery, display interactive digital maps indicating geographic locations where panoramic imagery (real or generated) is available, request and receive generated panoramic images, provide user-controls for requesting panoramic imagery reflecting user-specified conditions, provide various geolocated content, etc. Although FIG. 1 illustrates the panoramic imagery application 108 as a standalone application, the functionality of the panoramic imagery application 108 also can be provided in the form of an online service accessible via a web browser executing on the client device 102, as a plug-in or extension for another software application executing on the client device 102, etc. The panoramic imagery application 108 generally can be provided in different versions for different respective operating systems. For example, the maker of the client device 102 can provide a Software Development Kit (SDK) including the panoramic imagery application 108 for the Android™ platform, another SDK for the iOS™ platform, etc.

The server 130 may be configured to provide to receive requests for panoramic imagery, generate panoramic imagery, and transmit generated panoramic imagery to the client device 102. The server 130 includes one or more processors 132 and a memory 134. The memory 134 may be tangible, non-transitory memory and may include any types of suitable memory modules, including random access memory (RAM), read-only memory (ROM), flash memory, other types of persistent memory, etc. The memory 134 stores instructions executable on the processors 132 that make up a panoramic imagery generation module 136, which can process requests for panoramic imagery and generate panoramic imagery. In some implementations, the panoramic imagery generation module 136 may generate panoramic imagery before receiving a request from the client device 102 for such imagery, and cache the generated imagery for later retrieval.

The panoramic imagery generation module 136 may train and store a machine learning model operable to generate panoramic imagery. In some implementations, the machine learning model is a generative adversarial network (GAN) including two neural networks, a generator network and a discriminator network, as will be discussed in further detail with reference to FIGS. 6A-6B.

The server 130 can be communicatively coupled to databases 140, 142, and 144 storing geospatial information, existing panoramic images, and non-panoramic images, which may be used as training data for the machine learning model. The panoramic imagery database 140 includes panoramic images, which may be 360-degree panoramas. The panoramic images may be captured by an entity associated with the server 130 using 360-degree imaging equipment. The panoramic imagery application 108 may request existing panoramic images from the database 140, either directly or via the server 130. More particularly, the panoramic imagery database 140 may include street-side imagery made up of panoramic images stitched together to form a virtual environment, where the panoramic images are captured from the vantage point of a person or vehicle moving along a path or road. For example, a series of such panoramic images may be stitched together such that a user can navigate through the series of panoramic images to virtually re-create the experience of moving along the path or road.

The panoramic imagery application 108 may be configured to operate in a street-side mode. The street-side mode allows a user to navigate through a virtual environment formed by panoramic imagery. For example, the panoramic imagery application 108 enables a user to navigate through a virtual environment formed by the street-side imagery, such that the user virtually experiences moving along the path or road from which the street-side images were captured.

The user-generated content (UGC) database 142 includes images, which may be non-panoramic images or panoramic images. The panoramic images may be 360-degree panoramas. The images in the UGC database 142 include crowd-sourced images that are tagged (e.g., with metadata) with the time and location where the image was captured. These images are able to be provided from a wide variety of sources, such as user smart-devices. In this way, new panoramic imagery can be generated using such widely-available IGC imagery, making it easier to create new panoramic imagery without requiring panoramic cameras.

The map database 144 may include schematic and satellite data storing street and road information, topographic data, satellite imagery, information related to public transport routes, information about businesses or other points of interest (POI), navigation data such as directions for various modes of transportation, etc. The images the server 130 receives from the databases 140 and 142 may include metadata indicating times when and/or locations where the images were captured. The server 130 may receive information from the map database 144 (e.g., in response to a request from the server 130 to the map database 144 seeking information regarding a particular location) and transmit this information to the client device 102. The panoramic imagery application 108 can use the information to display interactive digital maps indicating geographic locations where panoramic imagery is available. As an example, the panoramic imagery application 108 operating in the street-side mode may display street-side imagery for a location and also display a map indicating the location and perspective from which the street-side imagery was captured. By interacting with the panoramic imagery application 108, a user can navigate through street-side imagery for locations depicted by the map.

In general, the server 130 may receive information related to geographic locations from any number of suitable databases, web services, etc. For example, the server 130 may be coupled to a weather database (not shown) which includes current or average weather data in various geographic areas, a natural disasters database (not shown) including current or common natural disasters that occur in various geographic areas, and/or a traffic database including current or average vehicle and/or pedestrian traffic on a road, path, or area.

Although the examples in this disclosure refer primarily to the server 130 generating panoramic imagery, the client device 102 may generate panoramic imagery instead of requesting generated panoramic imagery from the server 130. The panoramic imagery application 108, for example, may include the panoramic imagery generation module 136. The client device 102 may be communicatively coupled to the databases 140, 142, 144 with reference to the server 130, such that the client device 102 can provide the functionality of the server 130.

Example Techniques for Generating Panoramic Imagery

Figure 2:
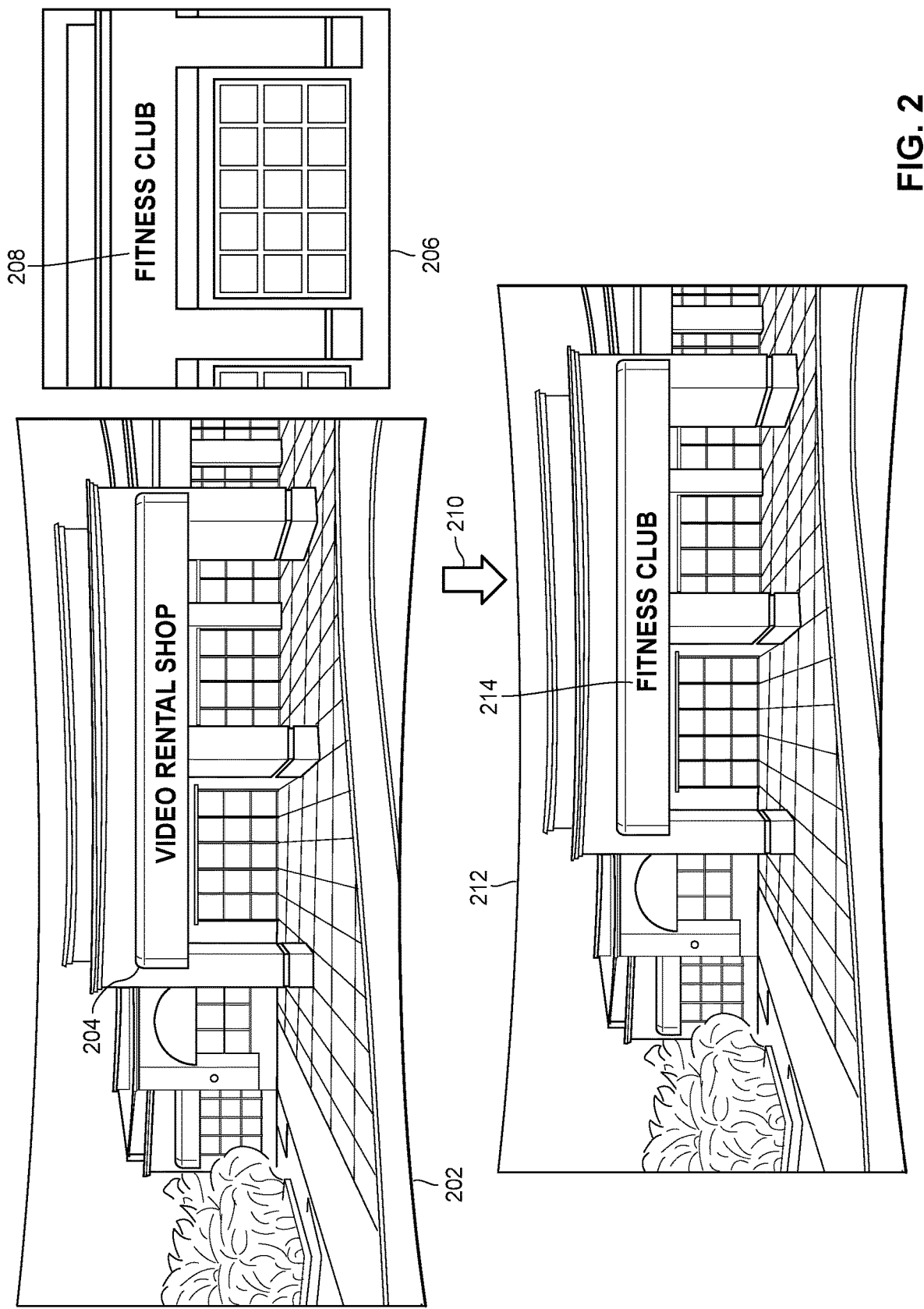
FIG. 2 illustrates an example panoramic image that may be generated using the techniques of this disclosure based on an existing panoramic image and a non-panoramic image including a physical object absent from the existing panoramic image.

FIG. 2 illustrates an example panoramic image that may be generated using the techniques of this disclosure based on an existing panoramic image and a non-panoramic image including a physical object absent from the existing panoramic image. In the example scenario of FIG. 2, a user may interact with the panoramic imagery application 108 using the client device 102 to explore panoramic imagery depicting a given location, referred to herein as "location A." In response to receiving a request from the client device 102 for panoramic imagery for location A, the server 130 may retrieve panoramic imagery, including a panoramic image 202, from the panoramic imagery database 140 and provide the panoramic imagery to the client device 102. Panoramic image 202 thus is an existing panoramic image of location A. The panoramic image 202 can be a 360-degree image, such that a user interacting with the image can rotate the image to view the scenery at location A in 360 degrees. The panoramic image 202 includes a sign 204 for a business located at location A. While FIG. 2 depicts a single panoramic image 202, the server 130 may retrieve a series of panoramic images corresponding to street-side imagery at location A and adjacent locations from the panoramic imagery database 140. The server 130 can generate new street-side imagery for location A to depict new objects and/or features such as snow, rain, etc., such that a user can virtually explore location A under various conditions.

More particularly, before or after providing the panoramic image 202 to the client device 102, the server 130 can determine that the panoramic image 202 may not reflect current conditions at location A. The server 130 can make this determination based on the time the user submits the request from the client device, the time the user explicitly specifies in the request (e.g., "show me street-side imagery at 6:00 pm"), the time the panoramic image 202 was captured, etc. Additionally or alternatively, the server 130 can determine that the panoramic image 202 is out-of-date based on the content of the panoramic image 202. In particular, the server 130 can retrieve, from the UGC database 142, images depicting location A (e.g., based on a location tag of the image) captured closer in time to when the request was made that the panoramic image 202. For example, the tag of the panoramic image 202 can specify the time of capture as approximately one year prior to the user request, and the tag of the retrieved image(s) depicting location A can specify the time of capture as approximately two weeks prior to the user request. The server 130 can compare the content of the retrieved images depicting location A with the panoramic image 202 and determine whether the retrieved images depict physical objects not included in the panoramic image 202. If so, the server 130 can determine that the panoramic image 202 is out-of-date, and identify the retrieved images as images to utilize to generate new panoramic imagery reflecting up-to-date conditions at location A.

In the example scenario of FIG. 2, the server 130 retrieves an image 206 from the UGC database 142. The image 206 also depicts imagery at location A (or at least some of the imagery at location A), but has a later time of capture than the panoramic image 202. In this specific example, the image 206 includes a new sign 208 for a business that apparently has replaced the business indicated by the sign 204. In the example of FIG. 2, the retrieved image 206 is a non-panoramic image. However, in some implementations, the retrieved image 206 may be a panoramic image. Further, the new sign 208 in this example is a an object present in the image 206 but absent from the panoramic image 202, but in other scenarios some object may be present in the panoramic image 202 but absent from the newer image 206 (e.g., a municipality may remove a traffic sign at location A after the panoramic image 202 is captured, and the newer image 206 can reflect this change). Still further, an object in the image 206 need not replace another object in the panoramic image 202 at the same location, and in general can appear anywhere in the image. In general, the skilled person would appreciate that objects depicted in the earlier-taken panoramic image 202 may be replaced or absent from the retrieved image 206, and/or objects depicted in the retrieved image 206 may be absent from the panoramic image 202. In any event, the retrieved image 206 depicts features (e.g. new objects, and/or replaced objects, and/or removed objects) that are not depicted in the panoramic image 202.

In some implementations, the server 130 provides the panoramic image 202 to the client device 102, and the panoramic imagery application 108 displays the panoramic image 202 to the user. The panoramic imagery application 108 may also indicate to the user, based on information received from the server 130, that existing panoramic imagery depicting location A is out-of-date, and ask the user whether the user would like to receive a generated, up-to-date, panoramic image. In response to receiving confirmation from the user, the panoramic imagery application 108 may request up-to-date panoramic imagery from the server 130. The user may also request up-to-date panoramic imagery via the panoramic imagery application 108 unprompted by the panoramic imagery application 108. Additional details regarding user interface elements are discussed below with reference to FIGS. 4A-4B.

In some implementations, the server 130 may not provide the panoramic image 202 to the client device 102. Instead, the server 130 can automatically identify, based on the time the panoramic image 202 was captured and/or based on the content of UGC images of location A, that the panoramic image 202 is out-of-date, generate up-to-date panoramic imagery, and provide the generated panoramic imagery to the client device 102.

Further, in various implementations, the server 130 may receive a request to update the existing panoramic imagery of a location from a third-party that is not necessarily the user requesting panoramic imagery via the client device 102. For example, a representative of the new business at location A may submit the image 206 to the UGC database 142 and indicate to the server 130 that existing panoramic imagery of location A should be updated to reflect the new sign 208 of the new business.

While the above discussion refers to the server 130 retrieving the image 206 from the UGC database 142, in some implementations, the server 130 may retrieve the image 206 from the panoramic image database 140.

In any event, the server 130 may perform a transformation 210 on the panoramic image 202 to generate a new panoramic image 212 based on the panoramic image 202 and the image 206. The generated panoramic image 212 depicts location A but includes the new sign 208 from the image 206. Although the image 206 depicting the location A is a non-panoramic image in this example, in other scenarios the image 206 may be a panoramic image, and the transformation 210 may include transforming the panoramic image 202 into the generated panoramic image 212 based on a panoramic image rather than a non-panoramic image.

The transformation 210 may include determining whether the panoramic image 202 and the image 206 depict the same geographic location or at least a portion of the same geographic location, location A in the example of FIG. 2. The server 130 may make this determination based on location data included in the metadata of the images 202 and 206 or using suitable image processing techniques to identify and compare features in two images.

If the panoramic image 202 and the image 206 depict the same geographic location, then the server 130 may compare the panoramic image 202 and the image 206 to determine whether the images 202, 206 depict different content. In particular, the server 130 may compare the images 202, 206 to determine whether the images depict different physical objects, and/or whether the image 206 depicts physical objects absent from the image 206.

For example, the server 130 may determine whether the images 202, 206 depict different physical objects at the same position in space. In the panoramic image 202, the sign 204 is located near the top of a building facing the street above a window. The server 130 can locate this position in space, as depicted in the image 206, to determine whether a different physical object is located at that position. In the image 206, the new sign 208 is located at the same (or at least similar) position as the sign 204, and the sign 204 is not present in the image 206. Based on this comparison, the server 130 can determine that the sign 204 was replaced by the new sign 208 at location A. To compare the images 202, 206, the server 130 can, for example, apply machine learning models or heuristic algorithms in order to detect the presence and location of objects (e.g., objects within known object classes) within the images 202, 206.

If the panoramic image 202 and the image 206 depict different geographic locations (unlike the example depicted in FIG. 2), the server 130 still may identify physical objects within the image 206 for extraction and insertion into the panoramic image 202. For example, a third-party or another user may indicate that the image 206 includes a physical object that should be reflected in the panoramic image 202 and submit the image 206 to the server 130 via the smart imagery application 108. For instance, an owner of a business may submit the image 206 of a different location of a business, and indicate that a similar sign is now located at location A and should be reflected in panoramic imagery of location A. As another example, the machine learning model can identify traffic signs, traffic lights, mail boxes, and other recurring objects. The server 130 in this case can use the panoramic image 202 along with a reference to a location (e.g., GPS coordinates) and a descriptor of an object (e.g., "stop sign") to select an image of the object from a database and insert the image at the referenced location to generate the new panoramic image 212. In this way, the up-to-date imagery can include traffic signs or signals that are actually present at the geographic location but are not depicted in the original panoramic image of the area. In this way, more accurate depictions of a geographic area are provided by the disclosed techniques.

The server 130 can extract the physical objects that are included in the image 206 but are absent from the panoramic image 202 and prepare the physical objects for insertion into the panoramic image 202. This preparation may include mapping the extracted physical objects to a projection corresponding to the panoramic image 202, scaling the extracted physical objects to a scale of the panoramic image 202, and aligning the physical objects within the panoramic image 202. Although described as mapping, scaling, and aligning the physical objects, in some implementations, some or all of these preparation steps may be performed first on the image 206, and the physical objects may be extracted from such a prepared version of the image 206 before being inserted into the panoramic image 202. The specific techniques of mapping, scaling and aligning as described in more detail below serve to produce accurate up-to-date panoramic imagery. Specifically, these techniques are used to ensure that the features present in the image 206 are accurately included in the panoramic imagery, by ensuring that the features appear in the correct location and that they have an accurate appearance. In other words, these techniques may be used to ensure that the generated panoramic image accurately depicts the geographic area. This serves to improve the generated panoramic imagery and provides a technical effect of generating panoramic imagery accurately depicting a geographical area.

If the image 206 is a non-panoramic image, then the transformation 210 includes mapping the extracted physical objects to a projection corresponding to the panoramic image 202. The mapping process refers to performing a mathematical transformation on the physical objects or retrieved image 206 to the space of the panoramic image 202. The server 130 can identify a projection type of the panoramic image 202. For example, the projection type may be a spherical projection, an equirectangular projection, a cubic projection, or a cylindrical projection. The server 130 may identify the projection type by analyzing the image properties or the metadata of the image, which may indicate the projection type. Based on the projection type, the server 130 can map the extracted physical objects to a coordinate system of the projection type. The coordinate system is a projected coordinate system defined on a two-dimensional surface (e.g., for display on a two-dimensional screen) that corresponds to the projection type of the panoramic image 202, such that coordinates of the coordinate system map to positions within the panoramic image 202.

If the image 206 is a panoramic image, but is of a different projection type than the panoramic image 202, then the transformation 210 may include mapping the extracted physical objects to the projection corresponding to the panoramic image 202, as discussed above. If the image 206 is a panoramic image of the same projection type as the panoramic image 202, then the transformation 210 does not need to include mapping to a different projection type.

The transformation 210 may also include scaling the extracted physical objects to a scale of the panoramic image 202. For example, if the image 206 is captured from a vantage point closer to the building than the vantage point of panoramic image 202, the extracted physical objects may be scaled down in size before being inserted into the panoramic image 202. A scaling factor may be identified based on the relative sizes of objects appearing in both the panoramic image 202 and the image 206, for example. A scaling factor may also be identified based on the scaling factor that produces realistic images, as determined by a machine learning model, discussed more in detail with reference to FIGS. 6A-6B.

The extracted physical objects and/or the image 206 may also be aligned within the panoramic image 202 such that the extracted physical objects are placed in a suitable location within the panoramic image 202. In the example depicted by FIG. 2, the new sign 208 is aligned within the panoramic image 202 such that it is positioned where the sign 204 was previously positioned. How to align the image 206 and/or the physical objects extracted from the image 206 within the panoramic image 202 may also be based on a comparison of the image 206 and the panoramic image 202 and the relative positions of objects appearing in both images 206, 202.

Merging the extracted physical objects that have been scaled and aligned with the panoramic image into the panoramic image may require additional processing. In some scenarios, the server 140 may need to remove other objects from the panoramic image 202, such as the sign 204 that is being replaced by the new sign 208. The server 130 then may insert extracted physical objects into the panoramic image 202. In some scenarios, the server 130 may insert the extracted physical objects into the panoramic image 202 as an overlay that covers a portion of the panoramic image 202. In addition, the server 130 can make further changes to the panoramic image 202 to increase the verisimilitude of the new panoramic image 212. In other words, the server 130 can make further changes to the panoramic image 202 to make the new panoramic image appear more realistic, as if the new panoramic image had been captured using a panoramic camera (rather than being a combination of panoramic image 202 and another image 206). For example, the server 130 may blend the edges of the extracted physical objects to make the objects appear more realistic within the new panoramic image 212. The server 130 may need to add shadows for the new physical objects and remove or modify existing shadows when generating the new panoramic image 212. As mentioned above, the above-described techniques may be used to make the resulting generated image more accurate, meaning that the generated image accurately depicts the geographic area.

The server 130 may implement some or all of the steps of the transformation 210 using a machine learning model, as discussed with reference to FIGS. 6A-6B. The machine learning model, for example, may be trained to extract physical objects from images, map the extracted physical objects to a coordinate system of a panoramic image, and merge the extracted, mapped physical objects to generate a new panoramic image. In this way, the machine learning model is specially adapted for the technical purpose of generating new panoramic imagery based on existing imagery and other images depicting physical objects. Depending on the implementation, multiple machine learning models can perform these functions. For example, a first machine learning model may extract physical objects from an image, while a second machine learning model may generate the new panoramic image using the output from the first machine learning model.

In addition, after generating the panoramic image 212, the server 130 can generate additional panoramic images depicting location A, or locations near the location A(e.g., in the same way as the panoramic image 212 and/or based on the panoramic image 212) and connect or "stitch" these images together to form interactive street-side imagery. More specifically, the server 130 can generate street-side imagery so as to provide a virtual environment through which a user can navigate as if the user were traveling along a path or road from which the panoramic images were captured.

Further, as mentioned above, in some implementations the client device 102 can perform the transformation 210 rather than the server 130. For example, the client device 102 can receive the panoramic image 202 from the server 130 and, in response to a request from the user received by the panoramic imagery application 108, generate the panoramic image 212.

Turning to FIG. 3, the techniques of this disclosure may also include generating panoramic imagery based on an existing panoramic image and one or more other images that do not necessarily correspond to the same geographic location as the existing panoramic image. In other words, the one or more other images may not depict any portion of the geographic location depicted in the panoramic image. The generated panoramic imagery may include features depicted in the one or more other images but absent from the existing panoramic image. In the example scenario of FIG. 3, a user may interact with the panoramic imagery application 108 using the client device 102 to explore panoramic imagery depicting a given location, referred to herein as "location B." In response to receiving a request from the client device 102 for panoramic imagery for location B, the server 130 may retrieve panoramic imagery, including a panoramic image 302, from the panoramic imagery database 140 and provide the panoramic imagery to the client device 102. Panoramic image 302 is an existing panoramic image of location B. The panoramic image 302 is a 360-degree image, such that a user interacting with the image can rotate the image to view location B in 360 degrees. While FIG. 3 depicts a single panoramic image 302, the server 130 may retrieve a series of panoramic images corresponding to street-side imagery of location B from the panoramic imagery database 140. The server 130 can generate new imagery that corresponds to new street-side imagery of location B, such that a user can virtually explore location B.

After the server 130 provides the panoramic image 302 to the client device, the panoramic imagery application 108 may display the panoramic image 302 to the user. The panoramic imagery application 108 may ask the user whether the user would like to receive a generated panoramic image depicting location B with different features (e.g., to show the location B under different conditions) and provide options for the user to select given features. In response to receiving a selection from the user, the panoramic imagery application 108 may request new panoramic imagery from the server 130 including the requested features. In some implementations, the server 130 may pre-generate panoramic images under different conditions and store the generated panoramic images, such that panoramic images are generated before receiving a specific user request. In other implementations, the generated panoramic images may be generated in response to a user request. In this way, the generated images need not be permanently stored in memory, but can be temporarily stored for the duration that the generated panoramic image is required by the user, thus making better use of storage space.

The server 130 may perform a transformation 310 on the panoramic image 302 to generate a new panoramic image 312 based on the panoramic image 302 and other images including features absent from the panoramic image 302. Features may include physical objects depicted in the figures or characteristics of the images more generally. For example, features may include patterns or visual manifestations of environmental conditions, including weather conditions (e.g., rain, snow, fog, ice, cloudy, sunny), daylight conditions (e.g., sunrise, daylight, sunset, night), and seasons (e.g., winter, spring, summer, fall). In addition, features may include patterns or visual manifestations of other transient conditions, such as crowd levels (e.g., no people in the image, a few people, or high level of crowds), natural disasters and/or damage from natural disasters (e.g., floodwaters, earthquake damage, tornados, hurricanes), etc. As discussed with reference to FIG. 4B, what features the transformation 310 involves may depend on a user-specified condition (e.g., a user may request panoramic images of the location B in snow).

The transformation 310 includes generating the new panoramic image 312 based on the panoramic image 302 and an image 306. The image 306 includes features absent from the panoramic image 302. In the example depicted in FIG. 2, the image 306 depicts a snow-covered environment. Although the image 306 is a non-panoramic image, the image 306 can be a panoramic image. The server 130 can retrieve the image 306 from the panoramic imagery database 140, or from the UGC database 142. In addition, although only one image 306 is depicted in FIG. 3, the transformation 310 may be based on multiple images with similar features as the image 306. Further, while the image 306 depicts a different location from the panoramic image 302, in some implementations the image 306 may depict snowy conditions at the same geographic location.

Generally speaking, the steps included in the transformation 310 depend on whether the image 306 is panoramic or non-panoramic, whether the image depicts the same or a different geographic location as the panoramic image 302, and what features are to be reflected in the new panoramic image 312. In the example of FIG. 3, the transformation 310 includes transforming the panoramic image 302 to depict the same geographic location, location B, when snow-covered.

If the panoramic image 302 and the image 306 depict the same geographic location (or at least a portion of the same geographic location), then the server 130 may compare the panoramic image 302 and the image 306 to determine what features of the panoramic image 302 and the image 306 are different. Based on the comparison, the server 130 can identify patterns in the image 306 corresponding to features that are absent from the panoramic image 302.

As depicted in FIG. 3, the panoramic image 302 and the image 306 can depict different geographic locations. The image 306 may be labeled or annotated with the features that are depicted in the image. The server 130 can extract visual manifestations and/or patterns of those features from the image 306 and prepare the extracted features for insertion into or overlay onto the panoramic image 302.

As one example, the server 130 can identify whether features such as one or more patterns indicative of a weather condition are included in the image 306. The image 306 includes patterns indicative of snow. The server 130 may use a machine learning model, as discussed with reference to FIGS. 6A-6B, trained to identify patterns indicative of different weather conditions.

As another example, the server 130 can identify whether features such as one more light conditions indicative of an amount of daylight (e.g., sunrise, daytime, sunset, night, etc.) are included in the image 306. The server 130 may use a machine learning model, as discussed with reference to FIGS. 6A-6B, trained to identify patterns indicative of different lighting conditions.

The server 130 can extract the features from the image 306 that are absent from the panoramic image 302 and prepare the features for insertion into the panoramic image 302. The preparation may be similar to the preparation discussed above with respect to physical objects. Accordingly, the preparation may include mapping the extracted features to a projection corresponding to the panoramic image 302, scaling the extracted features to a scale of the panoramic image 302, and aligning the features to appropriate locations within the panoramic image 302 (e.g., as "appropriate" as determined by how realistic the inserted features appear, which may be determined by a discriminator network). The mapping process refers to performing a mathematical transformation on the physical objects or retrieved image to the space of the panoramic image 302.

Similar to the transformation 210, how the extracted features are mapped depends on whether the image 306 is a non-panoramic image, panoramic image of the same projection type as the panoramic image 302, or panoramic image of a different projection type as the panoramic image 302. If the image 306 is a non-panoramic image (as in the case of FIG. 3), then the transformation 310 includes mapping the extracted features to a projection corresponding to the panoramic image 302. In a scenario where the image 306 is an image of a different projection type than the panoramic image 302, then the transformation 310 may include mapping the extracted features to a projection corresponding to the panoramic image 302. In a scenario where the image 306 is an image of the same projection type then the panoramic image 302, then the transformation 310 does not need to include mapping to a different projection type.

The transformation 310 may also include scaling the features to a scale of the panoramic image 302, and aligning the extracted features within the panoramic image 302 such that the extracted features are placed in a suitable location within the panoramic image 302. In the example depicted by FIG. 3, the extracted snow features are positioned within the panoramic images 302 to appropriate locations of snow. How to align the extracted features may be based on a comparison of the image 306 and the panoramic image 302. A machine learning model may be trained to identify, for various features, appropriate locations of those features such that any resulting generated panoramic imagery appears realistic.

Merging the extracted features that have been scaled and aligned into the panoramic image may require additional processing. In some scenarios, other features may need to be removed from the panoramic image 302 or may need to be changed. In an example where the transformation 310 includes inserting extracted lighting conditions into the panoramic image 302, the existing lighting conditions in the panoramic image 302 are transformed into the extracted lighting conditions. In some scenarios, the extracted features may be inserted into the panoramic image 302 as an overlay that covers a portion of the panoramic image 302. For example, the extracted snow patterns from the image 306 may be layered over portions of the panoramic image 302.

Applying the transformation 310 to the panoramic image 302 generates the new panoramic image 312, which depicts the location B covered in snow.

The server 130 can perform some or all of the steps of the transformation 310 using a machine learning model. For example, the server 130 may identify features such as patterns corresponding to weather conditions or light conditions, extract such features, and merge the features into panoramic imagery using a machine learning model, such as the generative machine learning model discussed with reference to FIGS. 6A-6B. In this way, the machine learning model is specially adapted for the technical purpose of generating realistic and accurate panoramic imagery that accurately reflects different environmental conditions.

Further, transformations of panoramic imagery may include combinations of the transformation 210 and the transformation 310. For example, the panoramic image 202 may be transformed to include both physical objects from the image 206, using steps of the transformation 210. and a weather condition, using steps of the transformation 310.

In addition, after the panoramic image 312 is generated, additional panoramic images depicting location B, or locations near the location B, may be generated (e.g., in the same way as the panoramic image 312 and/or based on the panoramic image 312) and stitched together to form street-side imagery. The street-side imagery forms a virtual environment that a user can navigate through as if the user were traveling along a path or road from which the panoramic images were captured.

As mentioned above with respect to the transformation 210, in some implementations, the client device 102 can perform the transformation 310 rather than the server 130. For example, the client device 102 can receive the panoramic image 302 from the server 130 and, in response to a request from the user received by the panoramic imagery application 108, generate the panoramic image 312.

Figure 4A:
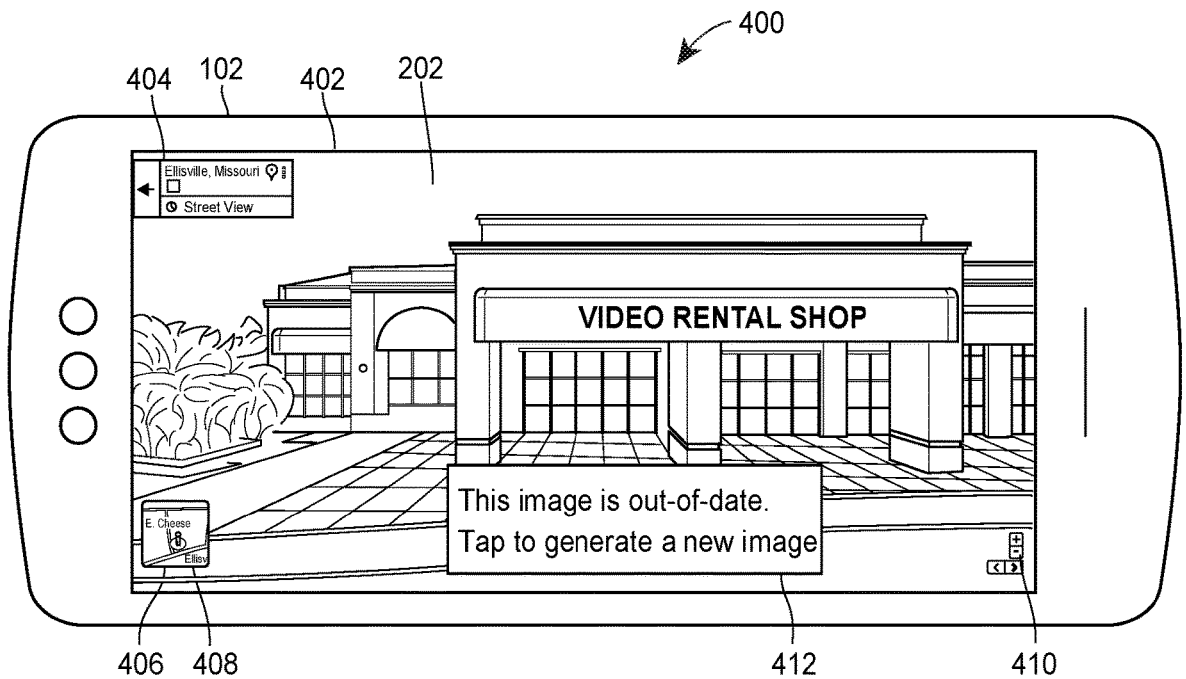
FIG. 4A illustrates an example user interface displaying an existing panoramic image and a notification that the existing panoramic image is out-of-date.

FIG. 4A illustrates an example user interface 400 displaying an existing panoramic image and a notification that the existing panoramic image is out-of-date. The user interface 400 may be displayed via a display 402 (e.g., of the user interface 116) of the client device 102. The user interface 400 may be a user interface of the panoramic imagery application 108. In response to a request from a user, a panoramic imagery application 108 may display available panoramic imagery for a location. In the example depicted in FIG. 4A, the panoramic imagery application 108 operates in a street-side mode, allowing a user to navigate through a virtual environment formed by panoramic imagery. The available panoramic imagery for the location includes the panoramic image 202.

In addition to the panoramic image 202, the user interface 400 may include user-selectable options and information relating to the location. A user interface element 404 includes an indication of the location where the user is virtually located and user-selectable options, such as options for navigating to a map of the location or viewing older street-side imagery of the location. A user interface element 406 may include a map of the location and include an icon 408 within the map. The icon 408 indicates where the user is located and the perspective the user is viewing (i.e., where the street-side imagery was captured and the direction the user is viewing within the virtual environment). Further, a user interface element 410 includes options for selecting a zoom level, rotating the view, or viewing additional imagery available for the location or near the location.

As discussed with reference to FIG. 2, the panoramic imagery application 108 can determine that the available panoramic image 202 may be out-of-date (e.g., based on the time stamp of the panoramic image 202, based on images captured at the location and stored at the UGC database 142 that depict objects not present in the panoramic image 202, based on a flag for the image or image location indicating that the appearance of the location has changed, etc.). The panoramic imagery application 108 can display a notification 412 indicating that the panoramic image is out of date. The notification 412 also may ask whether the user would like a new panoramic image to be generated. A user can select the notification 412 to indicate to the panoramic imagery application 108 to generate or request generated panoramic imagery for the location. In response, the panoramic imagery application 108 can generate, or send a request to the server 130 to generate, the new panoramic image 212. The new panoramic image 212 may be generated via the transformation 210, as discussed with reference to FIG. 2. After generation, the new panoramic image may be temporarily stored by panoramic imagery application for viewing by the user, and then may subsequently be deleted when no longer required. In this way, storage space is conserved since the generated images are only generated on request and not permanently stored.

Further, in some cases, the panoramic imagery application 108 can automatically generate and present the new panoramic image 212 to the user, without first presenting the notification 412 and/or the panoramic image 202. The panoramic imagery application 108 may choose this implementation, for example, if the quality of the new panoramic image 212 is high (e.g., the new panoramic image 212 is realistic, as measured by a discriminator network), or if there are a large number images in the UGC database 142 for the location. The panoramic imagery application 108 may display a notification to the user that the displayed image is generated and may display a user-selectable option to return to viewing the non-synthetic panoramic image 202.

Figure 4B:
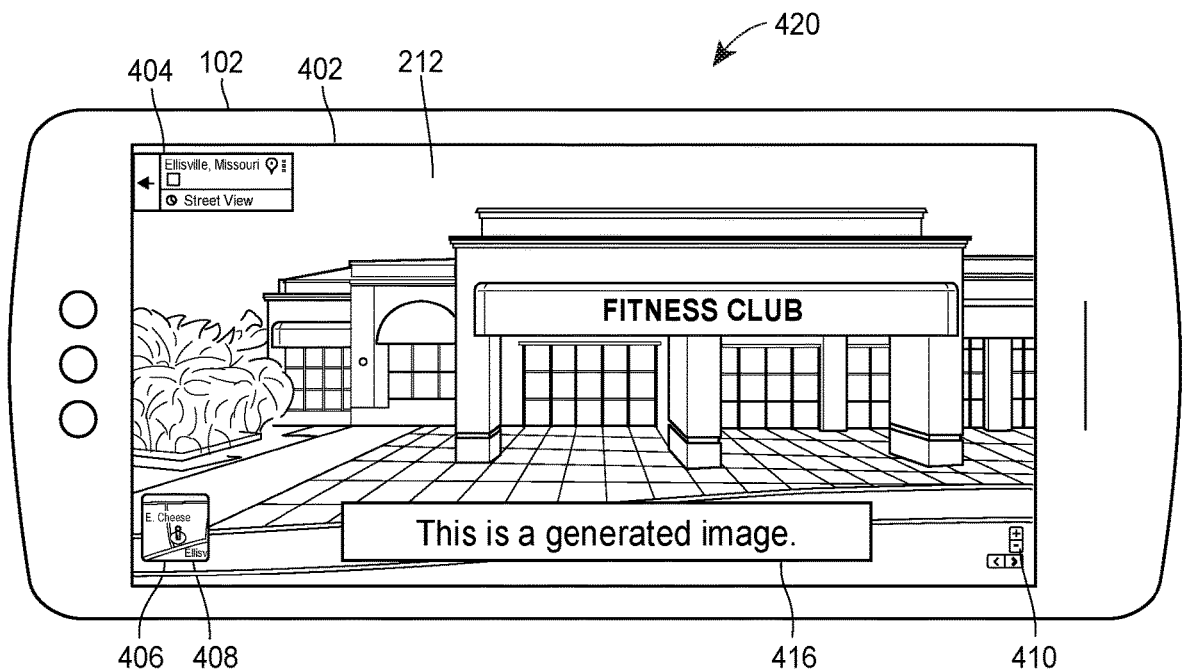
FIG. 4B illustrates an example user interface displaying a panoramic image generated based on the existing panoramic image of FIG. 4A and including a notification that the panoramic image is generated.

Turning to FIG. 4B, a user interface 420 displays the generated panoramic image 212. The user interface 420 may be similar to the user interface 400, but includes the new panoramic image 212. The client device 102 may display the user interface 420 after retrieving the new panoramic image 212. The user interface 420 may include a notification 416 that indicates that the panoramic image 212 is a generated image. If the user navigates within the virtual street-side environment, the panoramic imagery application 108 may continue to display generated panoramic imagery, and may continue to display the notification 416. New generated panoramic imagery for the locations may be generated as the user navigates, or may be pre-cached for locations that are ahead of or near the user's virtual location. If the quality of generated images decreases (e.g., quality as measured by image quality standards or as evaluated by a discriminator, as discussed with reference to FIGS. 6A-6B), the panoramic imagery application 108 may stop displaying generated panoramic images and return to displaying available panoramic images from the panoramic imagery database 140. In such a case, the panoramic imagery application 108 may display a notification to the user explaining that quality of generated images has decreased and is no longer available. In this way, the user is always provided with high-quality images, rather than images that may potentially be inaccurate (i.e. not an accurate depiction of a given geographic area).

Figure 5A:
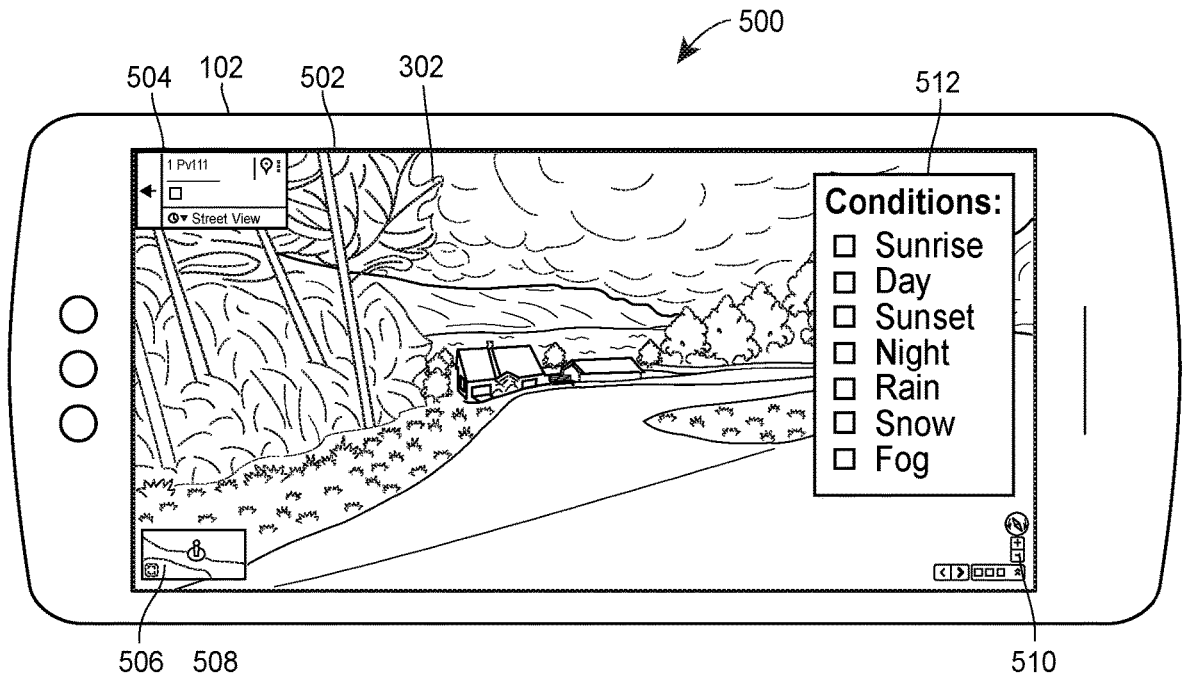
FIG. 5A illustrates an example user interface displaying an existing panoramic image depicting a geographic location and user-selectable options for accessing new panoramic images depicting the geographic location under different environmental conditions.

FIG. 5A illustrates an example user interface 500 displaying an existing panoramic image depicting a geographic location and user-selectable options for accessing new panoramic images depicting the geographic location under different environmental conditions. The user interface 500 may be displayed via a display 502 (e.g., of the user interface 116) of the client device 102. The user interface 500 is generally similar to the user interface 400, but depicts the panoramic image 302 and a tool 512. The user interface 500 also includes user interface elements 504, 506, 508, and 510 which may be similar to the user interface elements 404, 406, 408, and 410, respectively. The panoramic image 302, which depicts a different location from the panoramic image 202, depicts the location during the summer and/or when no snow is present.

The tool 512 includes user-selectable options to convert the panoramic image 302 into panoramic imagery depicting the location under different conditions. For example, the tool 512 may include options such as different lighting conditions (e.g., sunrise, day, sunset, night) and/or weather conditions (e.g., rain, snow, fog). Depending on what condition the user selects using the tool 512, the panoramic imagery application 108 can generate, or send a request to the server 130 to generate, a new panoramic image depicting the location under the condition (e.g., via transformation 310). Depending on the implementation and/or scenario, the panoramic imagery application 108 may display combinations of the tool 512 and the notification 412 to enable the user to request up-to-date imagery that also depicts the location under different conditions. In addition, a user may select multiple conditions of the tool 512. Further, the panoramic imagery application 108 may display different options in the tool 512 depending on the location. For example, the panoramic imagery application 108 may determine that it frequently snows at the location (e.g., based on information from the map database 144), and include "snow" in the tool 512. As another example, the panoramic imagery application 108 may determine that visitors often travel to or take pictures of the location at certain times of the day (e.g., based on information from the map database 144), and include those times as suggestions within the tool 512 (e.g., sunset). As a further example, the panoramic imagery application 108 may determine that the location is frequently affected by certain particular weather patterns, including severe weather (e.g., based on information from the map database 144), and include a suggestion to view a generated panoramic image of the location as it likely appears under these conditions.

Figure 5B:
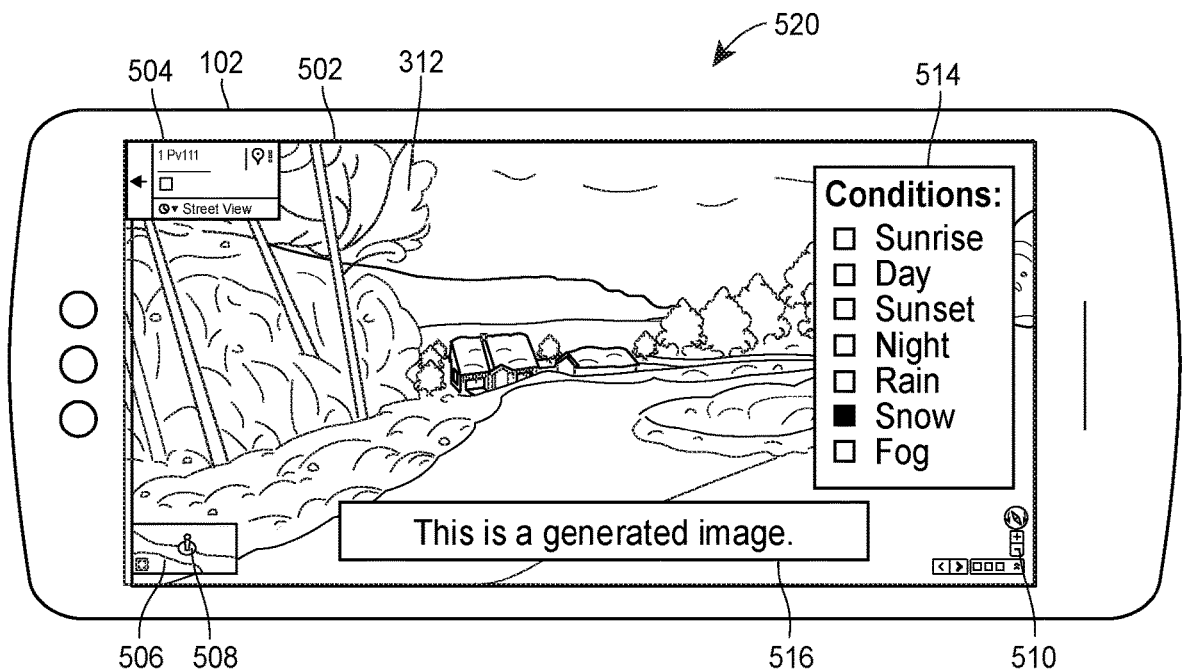
FIG. 5B illustrates an example user interface displaying a panoramic image generated based on the existing panoramic image of FIG. 5A and a user-selected environmental condition.

In the example depicted in FIG. 5B, a user selects the option "snow" from the tool 512. In response, the client device 102 retrieves and displays the new panoramic image 312, as depicted in user interface 520. The new panoramic image 312 depicts the location as it would appear covered in snow. The tool 514 is similar to the tool 512, but shows that the user selected the "snow" option. Further, the user interface 520 includes a notification 516, which may be similar to the notification 416 and indicates that the panoramic image 312 is generated. As discussed with reference to FIG. 4B, if the user navigates within the virtual street-side environment, the panoramic imagery application 108 may continue to display generated panoramic imagery under the selected condition, and may continue to display the notification 516. New generated panoramic imagery may be generated as the user navigates, or may be pre-cached for locations that are ahead of or near the user's virtual location. Further, the panoramic imagery application 108 may monitor the quality of the generated panoramic imagery and stop displaying generated panoramic imagery if the quality decreases.

As mentioned above, transformations such as the transformation 210, the transformation 310, and combinations of the transformations 210 and 310 may be performed utilizing a machine learning model. A generative adversarial network is an example of a machine learning model that may be trained and utilized to generate panoramic imagery including physical objects and/or features. FIGS. 6A-6B, respectively, illustrate training a machine learning model and applying the trained machine learning model to generate panoramic imagery. Some of the blocks in FIGS. 6A-6B represent data structures or memory storing data structures, registers, or state variables (e.g., blocks 606a-n, 608a-n, 622, 626, 628), other blocks represent hardware and/or software components (e.g., blocks 610, 612, 616), and other blocks represent output data (e.g., block 614a-n, 634, 636). Input signals are represented by arrows labeled with corresponding signal names.

Generally speaking, and as mentioned above, a panoramic imagery database 140 stores panoramic imagery, such as 360-degree panoramas and street-side imagery. When a user requests panoramic imagery depicting a geographic location under given conditions not reflected in existing panoramic imagery stored in the panoramic imagery database 140 (e.g., up-to-date, environmental conditions), the panoramic imagery generation module 136 may generate new panoramic imagery depicting the geographic location under the given conditions.

Figure 6A:
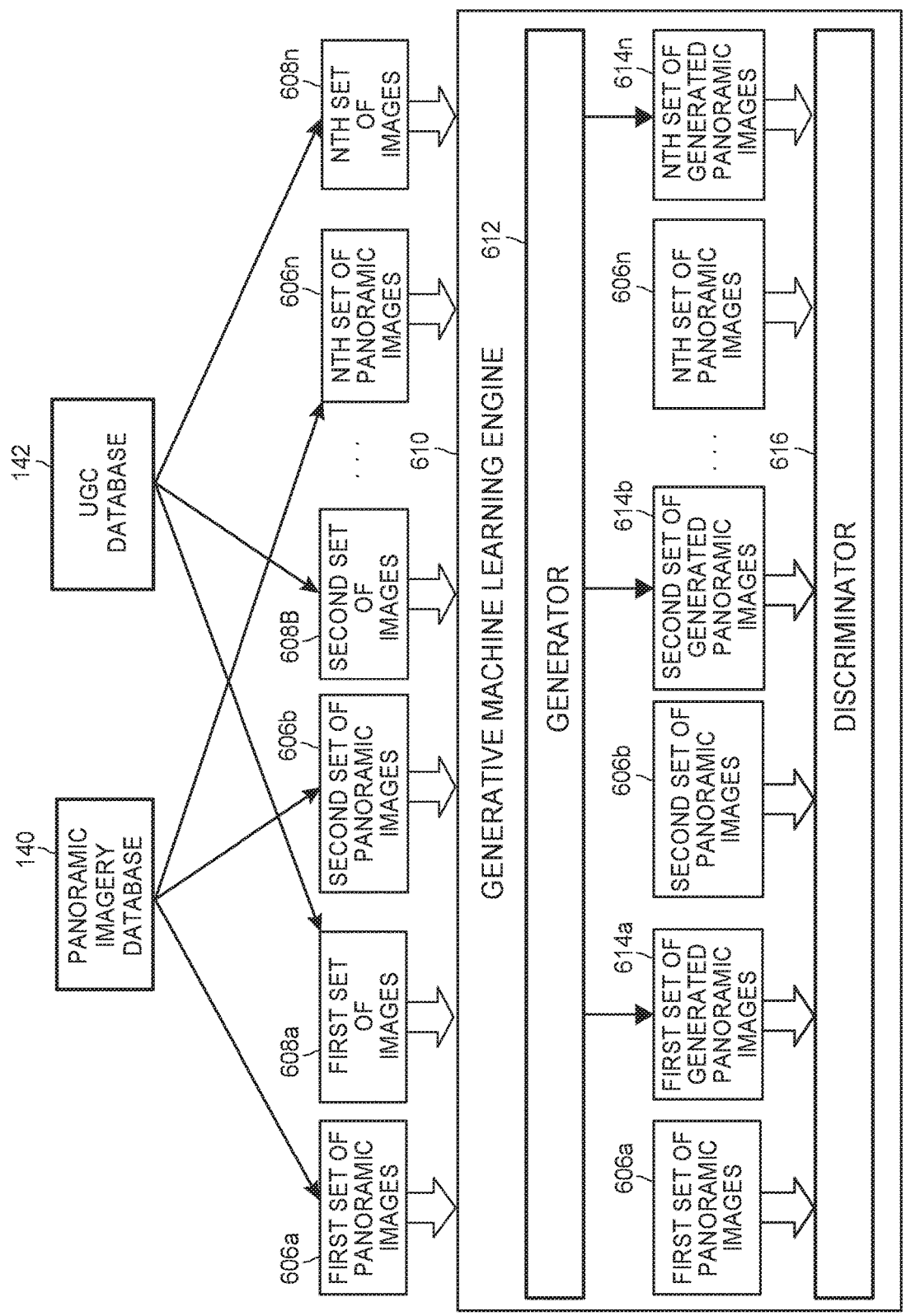
FIG. 6A is a combined block and logic diagram that illustrates the training of a generative adversarial network configured to generate panoramic imagery.
Figure 6B:
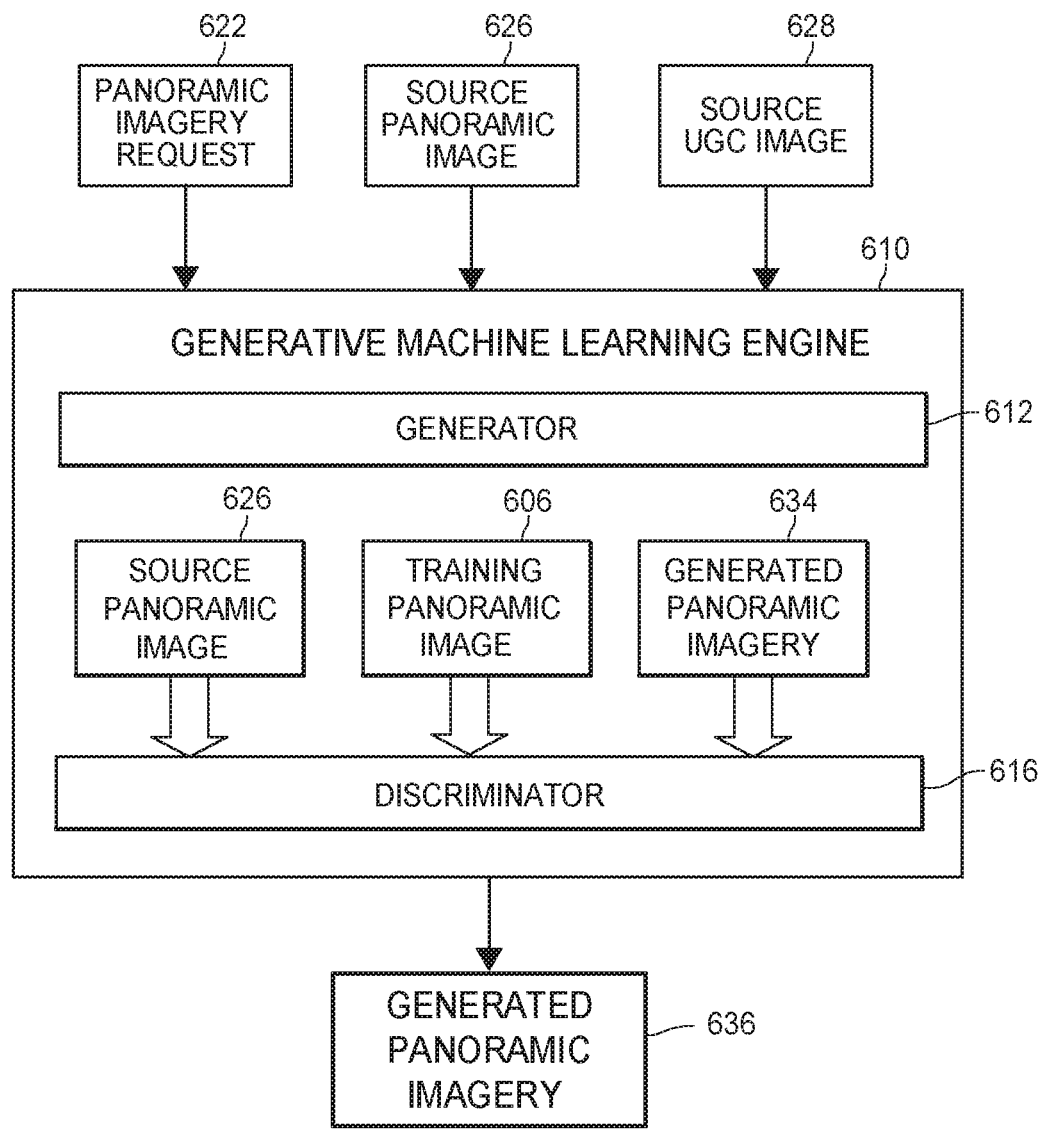
FIG. 6B is a combined block and logic diagram that illustrates the generation of panoramic imagery using the trained generative adversarial network of FIG. 6A.

FIG. 6A schematically illustrates how the server 130 can train the panoramic imagery generation module 136 of FIG. 1 to generate panoramic imagery. The panoramic imagery generation module 136 may include a generative machine learning engine 610 (which may be a GAN) to generate the new panoramic imagery based on a generative machine learning model approach. Broadly defined, a generative machine learning model approach involves training a generative engine to learn the regularities and/or patterns in a set of input data, such that the engine may generate new examples of the input data. As the generative engine is trained on more input data, the engine's generated new examples may increase in similarity to the input data. Thus, a goal of a generative machine learning model approach is to enable the generation of new examples of the input data that are similar to the original input data. While this disclosure describes generating panoramic imagery primarily with reference to a GAN, the generative machine learning engine 610 may include machine learning models of other types. Further, as mentioned above, different machine learning models may perform different steps of the panoramic imagery generation sequence.

To generate the panoramic imagery, the generative machine learning engine 610 receives training data from various sources. The training data includes a first set of panoramic images 606a for a first geographic area that are retrieved from the panoramic imagery database 140. The first set of panoramic images 606a may include panoramic images and street-side imagery. For example the first set of panoramic images 606a may be street-side images of the first geographic location captured from the vantage point of a particular path. The panoramic images of the first set of panoramic images 606a may depict the first geographic area under different conditions. For instance, the panoramic images may depict the first geographic area under various weather conditions, under various lighting conditions, in different seasons, before and after a change to the geographic area (e.g., at an earlier time, a later time, before a natural disaster, after a natural disaster), and/or combinations of various combinations. In addition, the training data includes a first set of images 608a for the first geographic area that are retrieved from the UGC database 142. Images from the first set of images 608a may be panoramic images and/or non-panoramic images.

The training data also includes a second set of panoramic images 606b for a second geographic area that are retrieved from the panoramic imagery database 140, which may be similar to the first set of panoramic images 606a, but for the second geographic area. In addition, the training data may include a second set of images 608b for the second geographic area retrieved from the UGC database, which may be similar to the first set of images 608a, but for the second geographic area. Similarly, the training data includes an nth set of panoramic images 606n for an nth geographic area with an nth set of images 608n for the nth geographic area. The sets of panoramic images 606a-606n may represent the available panoramic images for respective geographic areas from the panoramic imagery database 140.

Upon retrieval of the training data, the generative machine learning engine 610 may utilize the training data to train a generator 612 and a discriminator 616. For example, the generative machine learning engine 610 may pass the sets of panoramic images 606a-n and the sets of images 608a-608n through the generator 612 to create sets of generated panoramic imagery 614a-614n. Each set of the generated panoramic imagery 614a-614n may include any number of generated panoramic images. The generator 612 may stitch together the generated panoramic images to create street-side imagery.

The generator 612 may then pass the generated panoramic imagery 614a-n to the discriminator 616. The discriminator 616 may also receive the training panoramic images 606a-606n. Using both sets of data (e.g., 606a-606n and 614a-614n), the discriminator 616 may attempt to determine which images are not images of the sets of panoramic images 606a-606n. In other words, the discriminator 616 classifies which images of the generated panoramic imagery 614a-614n are "real," i.e., photographs captured by one or more cameras, or "fake," i.e., generated images.

For example, the discriminator 616 may analyze each image included in the first set of panoramic images 606a and each image included in the first set of generated panoramic images 614a. The discriminator 616 may determine characteristics of the images that are consistent, such as road placement, landmark placement, or other content of images depicting the geographic location. In addition to content, characteristics may include image parameters, such as size, aspect ratio, projection type, etc. In some implementations, the discriminator 616 may also use the images 608a-608n to determine consistent characteristics, such as consistent characteristics of images depicting the geographic location. In such implementations, the discriminator 616 would expect some image parameters between the first set of images 608a, the first set of panoramic images 606a, and the first set of generated panoramic images 614a, for example, to be different if the first set of images 608a include non-panoramic images.

If the discriminator 616 determines that a particular image is not a real image (e.g., because the particular image includes characteristics that deviate from the consistent characteristics), the discriminator 616 may flag the particular image as a generated image. In that case, the discriminator 616 may return the flagged image to the generator 612, and/or otherwise indicate to the generator 612 that an image from the sets of generated panoramic images 614a-614n is not sufficiently similar to real images such as the panoramic images 606a-606n (e.g., the output may indicate whether an input image is "real" or "generated"). The generator 612 may analyze the flagged image to determine the characteristics of the flagged image that resulted in the image being flagged. The classifications of the discriminator 616 thus serve as further training data for the generator 612. Accordingly, in future iterations of the generative machine learning process, the generator 612 may alter the panoramic imagery generation process to avoid a similar flagging result from the discriminator 616. In this manner, the generative machine learning engine 610 may progressively generate panoramic imagery that correspond more closely to the panoramic images 606a-606n. In other words, this allows accurate panoramic images to be generated that accurately depict the geographic area.

The server 130 can train the generative machine learning engine 610 to learn the transformations from a first panoramic image of a geographic location to a second panoramic image of the geographic location depicting the geographic location with different features. Such features may include different conditions such as weather conditions or light conditions, or different physical objects. In particular, the generative machine learning engine 610 may be trained to perform the transformation 210, the transformation 310, and combinations of the transformations 210 and 310.

For example, the server 130 can train the generator 616 to insert physical objects from images of a geographic location captured at a later time into panoramic images captured at an earlier time in order to create an "up-to-date" image of the geographic location. The generator 616 may be trained to perform the steps discussed above with respect to the transformation 210, including extraction of physical objects from one or more images, mapping the extracted physical objects to a coordinate system of the projection type of a source panoramic image, and merging the extracted physical objects into the source panoramic image to generate a new panoramic image. To merge the extracted physical objects, the generator 616 may be trained to identify scaling factors relating the sizes of different images and how to align physical objects into an existing panoramic image. The generator 616 may also be trained to blend the physical objects into existing panoramic images in ways that appear realistic.

Further, the server 130 can train the generator 616 to insert features from images into panoramic images. The features may be associated with weather conditions, lighting conditions, or other transient conditions that may not be reflected in available panoramic or street-side imagery. The generator 616 may be trained to perform the steps discussed above with respect to the transformation 310, including identifying features from one or more images, mapping the extracted features to a coordinate system of the projection type of a source panoramic image, and merging the extracted features into the source panoramic image to generate a new panoramic image. How the generator 616 identifies different features may vary based on the feature. For example, the generator 616 may identify one or more patterns associated with different weather conditions, one or more lighting conditions associated with different amounts of daylight, one or more patterns indicative of a different season, etc. The generator 616 may also be trained to generate street-side imagery based on the generated panoramic imagery that can be navigated through by a user. The generator 616 may be trained to generate the street-side imagery by stitching together generated panoramic images.

The trained generative machine learning engine 610 may be used to generate panoramic imagery reflective of a particular condition for a particular geographic location. To illustrate, and as shown in the example scenario of FIG. 6B, the generative machine learning engine 610 may receive data indicative of a request 622 to generate new panoramic imagery. The request 622 may indicate a requested condition that should be reflected in the generated panoramic imagery, and may indicate a geographic location that should be depicted in the generated panoramic imagery. The requested condition may be expressed as text (e.g., "snowy") or as an image (e.g., an image of a location under snowy conditions). In addition, the request 622 may indicate a perspective or vantage point that the panoramic imagery is requested for (e.g., from a particular street or path). The data in the request 622 may be indicated by a user interacting with the panoramic imagery application 108, and the new panoramic imagery may be generated in real time or generated and cached for the user. In other implementations, the request 622 may not be associated with a particular user, but may be associated with a request for a batch job for panoramic imagery reflecting different conditions of one or more geographic locations.

For example, in an implementation where the request 622 is associated with a particular user, the user may be interacting with the panoramic imagery application 108. The panoramic imagery application 108 may request panoramic imagery for a location from the server 130, and the server 130 may provide an available panoramic image for the geographic location, referred to in the context of FIG. 6B as a source panoramic image 626, for display on the client device 102. In response, the user may request an up-to-date panoramic image reflecting the geographic location at a more recent time, or reflecting a different condition. In some embodiments, the server 130 and/or panoramic imagery application 108 may automatically determine that the source panoramic image 626 is out-of-date (e.g., by comparing the time stamp of the source panoramic image 626 to the time of the user request for panoramic imager, or by comparing the source panoramic image 626 to more recently captured images from the UGC database 642) and automatically request generated panoramic imagery. The panoramic imagery application 108 may ask the user whether the user would like to receive updated panoramic imagery. Similarly, in some embodiments, the server 130 and/or panoramic imagery application 108 may automatically determine that the source panoramic image 626 depicts certain conditions and automatically request generated panoramic imagery reflective of different conditions. The panoramic imagery application 108 may ask the user whether the user would like to receive panoramic imagery of the geographic location in different conditions.

In any event, the engine 610 retrieves the source panoramic image 626 of the geographic location from the panoramic imagery database 610. The source panoramic image 626 may be a street-side image comprised of multiple panoramic images stitched together. Correspondingly, any generated panoramic images may also be street-side images. In addition, the engine 610 also retrieves one or more source UGC images 628, which are available UGC images (panoramic and/or non-panoramic) for the geographic location from the UGC database 142, or from different geographic locations depicting conditions included in the request 622. In some scenarios, the source UGC image 628 may be unavailable (e.g., there may be no UGC images for the geographic location). Once the engine 610 receives both the request 622, the source panoramic image 626, and the source UGC image 628, the engine 610 may proceed with the panoramic imagery generation process.

The engine 610 may first pass both the request 622, the source panoramic image 626, and the source UGC image 628 (if available) to the generator 612. The generator 612 may then analyze the source panoramic image 626 in conjunction with the source UGC image 628 and conditions included in the request 622 to generate new panoramic imagery 634. The generated panoramic imagery 634 may be one or more panoramic images, and may be street-side imagery representing stitched together panoramic images. In reference to the example of FIG. 2, the generator 612 may generate an up-to-date panoramic image 212 based on an existing panoramic image 202 (e.g., the source panoramic image 626) and a more-recent image 206 (e.g., the source UGC image 628), despite not having a panoramic image including physical objects depicted in the image 206. In reference to the example of FIG. 3, the generator 612 may generate a panoramic image 312 based on an existing panoramic image 302 (e.g., the source panoramic image 626). In such an example, images of the location may not be available for conditions included in the request 622, but the generator 612 can still generate the panoramic image 312 after being trained using images from other locations depicting the conditions.

The generator 612 may pass the generated panoramic imagery 634 to the discriminator 616, along with the source panoramic image 626. The generator 612 may also pass other training panoramic images 606 (e.g., from the panoramic images 606a-606n) to the discriminator 616. The discriminator can then attempt to determine which received images are not the source panoramic image 626 or the training panoramic images 606. If the discriminator 616 determines that the generated panoramic imagery 634 includes characteristics that deviate beyond what the discriminator 616 expects a panoramic image for the geographic location to have, the discriminator 616 may flag the generated panoramic image 634, as described above. However, should the discriminator 616 not flag the generated panoramic image 634, the engine 610 may determine that the generated panoramic image should be transmitted to the user for display (or stored for later transmissions to users). Accordingly, the engine 610 may designate the "passing" generated panoramic imagery 634 as the generated panoramic imagery 636, and transmit the image to the client device 102 for display (or store the generated panoramic imagery 636 in the panoramic imagery database 140 or another similar database for later display on client devices). In this way, the GAN is specifically adapted to generate panoramic images and determine the accuracy of the generated images, such that the user is only provided with generated panoramic images that are sufficiently accurate depictions of the geographic area. In other words, the GAN is specially adapted for the technical purpose of generating and providing sufficiently accurate panoramic images to a user. In some implementations, generative machine learning engine 610 may not pass the generated panoramic imagery 634 to the discriminator 616 before designating the generated panoramic imagery as "passing" generated panoramic imagery 636. Thus, while the generative machine learning engine 610 may train the generator 612 using the discriminator 616, after the generator 612 is deployed, images do not necessarily need to pass through the discriminator 616 before being displayed to a user.

Figure 7:
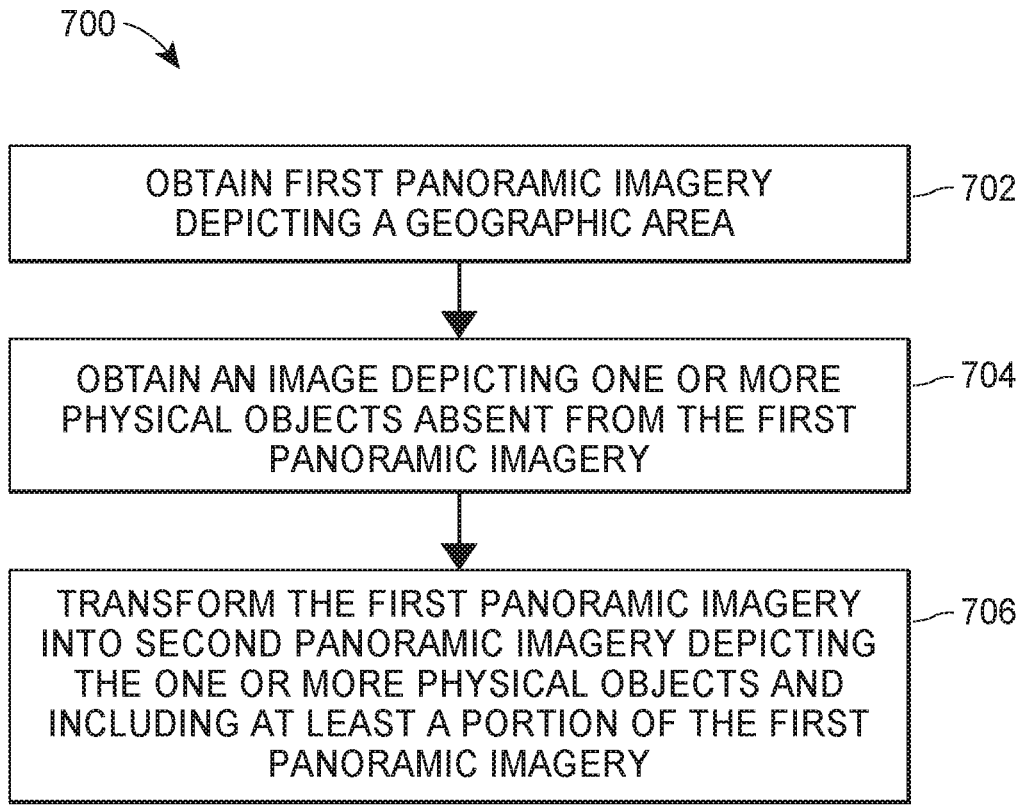
FIG. 7 is a flow diagram of an example method for generating panoramic imagery, which can be implemented in a computing device of FIG. 1.

FIG. 7 is a flow diagram of an example method 700 for generating panoramic imagery, which can be implemented in a computing device of FIG. 1. In scenarios where the server 130 implements the panoramic imagery generation module 136, the method 700 may be performed by the server 130. In scenarios where the client device 102 implements the panoramic imagery generation module 136, the method 700 may be performed by the client device 102. In some implementations, the method 700 may begin in response to a user request for panoramic imagery of a geographic area (e.g., a request made via the panoramic imagery application 108 implemented at the client device 102). In other implementations, the method 700 may be part of a processing job to generate and cache new panoramic imagery for a geographic location or region so that the panoramic imagery is available for retrieval in response to later user requests.

At block 702, the computing device obtains first panoramic imagery depicting a geographic area (e.g., panoramic image 202). The computing device may retrieve the first panoramic imagery from the panoramic imagery database 140. Further, the first panoramic imagery may include multiple panoramic images, which may be stitched together or capable of being stitched together to form street-side imagery.

At block 704, the computing device obtains an image depicting one or more physical objects absent from the first panoramic imagery. The image may be a panoramic image that the computing device retrieves from the panoramic imagery database 140, or a panoramic image or non-panoramic image that the computing device retrieves from the UGC database 142. The computing device may compare the first panoramic imagery and the image to determine whether the image includes physical objects absent from the panoramic imagery. The image may depict the same geographic area as the first panoramic imagery (or depict at least a portion of the same geographic area) or a different geographic area. In some implementations, block 704 may include obtaining multiple images depicting one or more physical objects absent from the first panoramic imagery.

At block 706, the computing device transforms the first panoramic imagery into second panoramic imagery depicting the one or more physical objects and including at least a portion of the first panoramic imagery (e.g., transformation 210).

The second panoramic imagery may depict the geographic area from the first panoramic imagery, but include the one or more physical objects. For example, the image obtained at block 704 may depict the geographic area at a more recent time than the first panoramic imagery. Physical objects may have added to the geographic area or replaced other physical objects at the geographic area since the first panoramic imagery was captured. Accordingly, the second panoramic imagery depicts the geographic area at the time the image was captured. If the image and the first panoramic imagery depict the same or a similar geographic area, the physical objects absent from the first panoramic imagery may be identified by comparing the images. If the image and the first panoramic imagery depict different geographic locations, transforming the first panoramic imagery may include applying a machine learning model (e.g., the generative machine learning engine 610) trained to identify predetermined objects, identifying that a predetermined object is in the image and not present in the first panoramic imagery, and merging the predetermined object into the first panoramic imagery.

Transforming the first panoramic image into the second panoramic imagery may include extracting the physical objects from the image. The transformation may also include performing a mathematical transformation on the image or extracted physical objects to map the image or extracted physical objects to a space of the first panoramic image. If the image is non-panoramic, the mathematical transformation may include identifying a projection type of the first panoramic imagery and mapping the one or more physical objects to a coordinate system of the projection type. The mapped one or more physical objects may then be merged into the first panoramic imagery to generate the second panoramic imagery. Merging the physical objects may include inserting or overlaying the physical objects into the first panoramic imagery, and may further include processing the first panoramic imagery to blend the physical objects into the first panoramic imagery (e.g., by removing existing physical objects, adjusting shadows, etc.).

Transforming the first panoramic imagery may include applying a generator network (e.g., the generator 612) of a GAN (e.g., the generative machine learning engine 610) including the generator network and optionally a discriminator network (e.g., the discriminator 616) to perform one or more steps of the transformation described above (e.g., to extract physical objects from the image and merge the physical objects into the first panoramic imagery to generate the second panoramic imagery). Transforming the first panoramic imagery may also include applying the discriminator network to the second panoramic imagery to classify the second panoramic imagery as real or generated. If the discriminator network classifies the second panoramic imagery as generated, then the method 700 may include applying the generator network to the first panoramic imagery and the image to generate third panoramic imagery depicting the panoramic imagery depicting the one or more physical objects. This third panoramic imagery may be passed to the discriminator.

Further, transforming the first panoramic imagery may include inserting other features in addition to the physical objects (e.g., elements of the transformation 310). For example, the generator network may be applied to the first panoramic imagery to insert one or more patterns indicative of weather conditions into the first panoramic imagery that are absent from the first panoramic imagery. The generator network may be trained to identify the one or more patterns indicative of the weather condition using a plurality of training panoramic images and a plurality of training images (e.g., images 606a-606n, 608a-608n). As another example, the generator network may be applied to the first panoramic imagery to insert one or more lighting conditions indicative of an amount of daylight into the first panoramic imagery, where the amount of daylight is different from what is depicted in the first panoramic imagery. The generator network may be trained to identify the one or more lighting conditions using a plurality of training panoramic images and a plurality of training images (e.g., images 606a-606n, 608a-608n).

Transforming the first panoramic imagery into the second panoramic imagery may include generating multiple panoramic images and stitching the panoramic images together to form street-side imagery. The generator network may be trained to perform such stitching.

If not generated at the client device 102, the second panoramic imagery can be transmitted to the client device 102. The client device 102 can then display the second panoramic imagery to a user.

Figure 8:
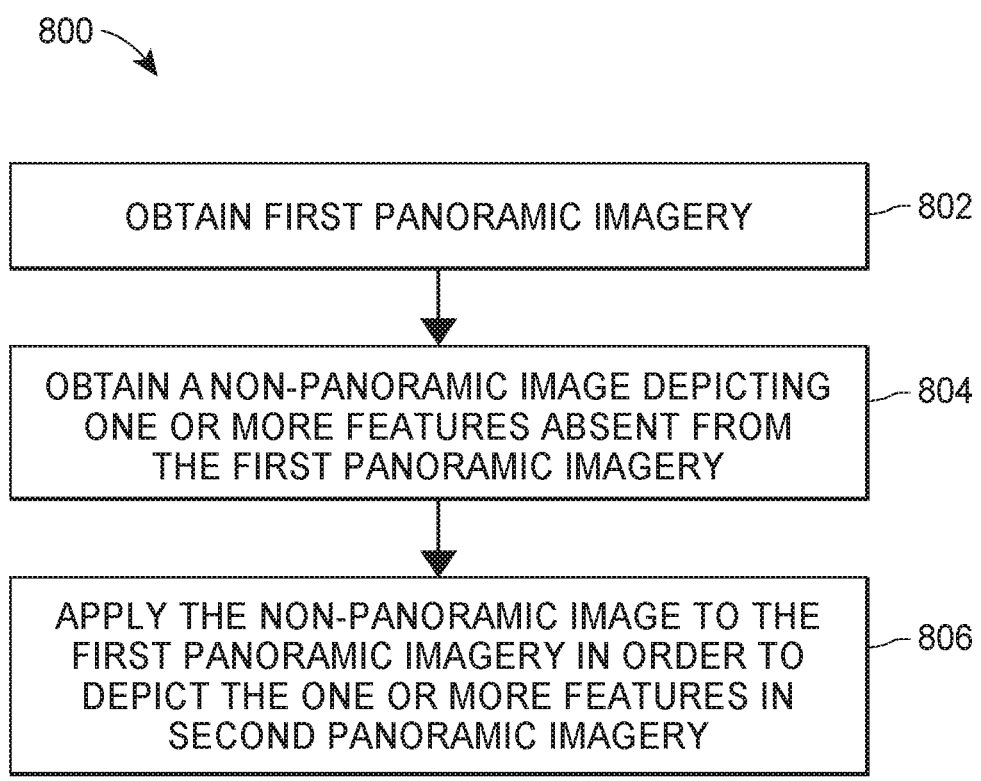
FIG. 8 is a flow diagram of another example method for generating panoramic imagery, which can be implemented in a computing device of FIG. 1.

FIG. 8 is a flow diagram of another example method for generating panoramic imagery, which can be implemented in a computing device of FIG. 1. Similar to method 700, in scenarios where the server 130 implements the panoramic imagery generation module 136, the method 800 may be performed by the server 130. In scenarios where the client device 102 implements the panoramic imagery generation module 136, the method 800 may be performed by the client device 102. In some implementations, the method 800 may begin in response to user request for panoramic imagery of a geographic area (e.g., a request made via the panoramic imagery application 108 implemented at the client device 102). In other implementations, the method 800 may be part of a processing job to generate and cache new panoramic imagery for a geographic location or region so that the panoramic imagery is available for retrieval in response to later user requests.

At block 802, the computing device obtains first panoramic imagery (e.g., panoramic image 302). The computing device may retrieve the first panoramic imagery from the panoramic imagery database 140. Further, the first panoramic imagery may include multiple images, which may be stitched together or capable of being stitched together to form street-side imagery.

At block 804, the computing device obtains a non-panoramic image depicting one or more features absent from the first panoramic imagery. The non-panoramic image may be retrieved from the UGC database 142. The computing device may compare the first panoramic imagery and the image to determine whether the image includes features absent from the panoramic imagery. The image may depict the same geographic area as the first panoramic imagery (or at least a portion of the same geographic area) or a different geographic area. In some implementations, block 804 may include obtaining multiple images depicting the features absent from the first panoramic imagery. The computing device may retrieve the non-panoramic image (or images) including certain features based on conditions indicated in a user request (e.g., the request 622).

At block 806, the computing device applies the non-panoramic image to the first panoramic imagery in order to depict the one or more features in the second panoramic imagery. Applying the non-panoramic image to the first panoramic imagery may include similar steps as those discussed with reference to block 706. For instance, applying the non-panoramic image to the first panoramic imagery may include extracting the one or more features, identifying a projection type of the first panoramic imagery, mapping the one or more features to a coordinate system of the projection type, and merging the mapped features into the first panoramic imagery to generate the second panoramic imagery. If the features include a physical object, then merging the features may include inserting the mapped physical object into the first panoramic imagery. If the features include a manifestation of an environmental condition, then merging the features may include overlaying the mapped manifestation onto the first panoramic imagery. As discussed with reference to block 706, the application of the non-panoramic image to the first panoramic imagery may be performed using a GAN.

Transforming the first panoramic imagery into the second panoramic imagery may include generating multiple panoramic images and stitching the panoramic images together to form street-side imagery. The generator network may be trained to perform such stitching.

If not generated at the client device 102, the second panoramic imagery can be transmitted to the client device 102. The client device 102 can then display the second panoramic imagery to a user.

By way of example, and not limitation, the disclosure herein contemplates the following aspects:

1. A method for creating panoramic imagery, the method comprising: obtaining, by one or more processors, first panoramic imagery depicting a geographic area; obtaining, by the one or more processors, an image depicting one or more physical objects absent from the first panoramic imagery; and transforming, by the one or more processors, the first panoramic imagery into second panoramic imagery depicting the one or more physical objects and including at least a portion of the first panoramic imagery.

2. The method of aspect 1, wherein transforming the first panoramic imagery includes: applying a generator network of a generative adversarial network (GAN), the GAN including the generator network and a discriminator network, to the first panoramic imagery and the image to: extract the one or more physical objects from the image; and merge the one or more physical objects into the first panoramic imagery to generate the second panoramic imagery.

3. The method of aspect 2, wherein transforming the first panoramic imagery includes: applying the discriminator network to the second panoramic imagery to classify the second panoramic imagery as real or generated; if the discriminator network classifies the second panoramic imagery as generated, applying the generator network to the first panoramic imagery and the image to generate third panoramic imagery depicting the one or more physical objects.

4. The method of aspect 2 or 3, further comprising: training the generator network using a plurality of panoramic images and a plurality of images to extract physical objects from the plurality of images and merge the physical objects into the plurality of panoramic images; and training the discriminator network using the plurality of panoramic images and a plurality of generated panoramic images generated by the generator network to classify the plurality of generated panoramic images as generated or real, wherein training the generator network further includes training the generator network using classifications from the discriminator network.

5. The method of aspect 2, wherein transforming the first panoramic imagery further includes: applying the generator network to the first panoramic imagery to insert one or more patterns indicative of a weather condition into the first panoramic imagery, the one or more patterns absent from the first panoramic imagery.

6. The method of aspect 5, further comprising: training the generator network using a plurality of panoramic images and a plurality of images to identify the one or more patterns indicative of the weather condition and to insert the one or more patterns into the plurality of panoramic images.

7. The method of aspect 2, wherein transforming the first panoramic imagery includes: applying the generator network to the first panoramic imagery to insert one or more light conditions indicative of a first amount of daylight into the first panoramic imagery, the first amount of daylight different from a second amount of daylight depicted in the first panoramic imagery.

8. The method of aspect 7, further comprising: training the generator network using a plurality of panoramic images and a plurality of images to identify the one or more light conditions and to insert the one or more light conditions into the plurality of panoramic images.

9. The method of any one of the preceding aspects, wherein the image is a non-panoramic image, and wherein transforming the first panoramic imagery includes: extracting the one or more physical objects from the non-panoramic image; identifying a projection type of the first panoramic imagery; mapping the one or more physical objects to a coordinate system of the projection type; and merging the mapped one or more physical objects into the first panoramic imagery to generate the second panoramic imagery.

10. The method of any one of the preceding aspects, wherein the image depicts the geographic area, and wherein transforming the first panoramic imagery includes:

comparing the first panoramic imagery and the image to identify the one or more physical objects absent from the first panoramic imagery.

11. The method of any one of aspects 1-9, wherein the geographic area is a first geographic area the image depicts a second geographic area, and wherein transforming the first panoramic imagery includes: applying to the image a machine learning model trained to identify a plurality of predetermined objects; identifying, based on the application of the machine learning model, that the image includes a predetermined object of the plurality of predetermined objects that is not present in the first panoramic imagery; and merging the predetermined object into the first panoramic imagery.

12. The method of any one of the preceding aspects, wherein the image was captured at a second time that is after a first time that the first panoramic imagery was captured; and wherein transforming the first panoramic imagery includes: transforming the first panoramic imagery into the second panoramic imagery depicting the geographic area at the second time.

13. A method for creating panoramic imagery, the method comprising: obtaining, by one or more processors, first panoramic imagery; obtaining, by the one or more processors, a non-panoramic image depicting one or more features; and applying, by the one or more processors, the non-panoramic image to the first panoramic imagery in order to depict the one or more features in second panoramic imagery.

14. The method of aspect 13, wherein applying the non-panoramic image to the first panoramic imagery includes: extracting, from the non-panoramic image, the one or more features; identifying a projection type of the first panoramic imagery; mapping the one or more features to a coordinate system of the projection type; and merging the one or more mapped features into the first panoramic imagery to generate the second panoramic imagery.

15. The method of aspect 14, wherein the one or more features include a physical object, and wherein merging the one or more mapped features includes: inserting the mapped physical object into the first panoramic imagery.

16. The method of aspect 14 or 15, wherein the one or more features include a manifestation of an environmental condition, and wherein merging the one or more mapped features includes: overlaying the mapped manifestation onto the first panoramic imagery.

17. The method of any one of aspects 13-16, wherein applying the non-panoramic image to the first panoramic imagery includes: applying the non-panoramic image to the first panoramic imagery using a generator network of a generative adversarial network (GAN), the GAN including the generator network and a discriminator network, to: extract the one or more features from the non-panoramic image; identify a projection type of the first panoramic imagery; map the one or more features to a coordinate system of the projection type; and merge the one or more mapped features into the first panoramic imagery to generate the second panoramic imagery.

18. The method of aspect 17, further comprising: applying the discriminator network to the second panoramic imagery to classify the second panoramic imagery as real or generated; if the discriminator network classifies the second panoramic imagery as generated, applying the non-panoramic image to the first panoramic imagery using the generator network to generate third panoramic imagery.

19. The method of aspect 17 or 18, further comprising: training the generator network using a plurality of panoramic images and a plurality of non-panoramic images to apply non-panoramic images to panoramic images; and training the discriminator network using the plurality of panoramic images and a plurality of generated panoramic images generated by the generator network to classify the plurality of generated panoramic images as generated or real, wherein training the generator network further includes training the generator network using classifications from the discriminator network.

20. The method of any one of aspects 13-19, wherein the first panoramic imagery depicts a geographic location and the non-panoramic image depicts the geographic location, and wherein applying the non-panoramic image to the first panoramic imagery includes: comparing the first panoramic imagery and the non-panoramic image to identify the one or more features absent from the first panoramic imagery.

21. A computing device for creating panoramic imagery, the computing device comprising one or more processors configured to implement a method according to any one of aspects 1-20.

22. A computer-readable medium carrying instructions that, when executed by one or more processors, cause the one or more processors to carry out a method according to any one of aspects 1-20.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating panoramic imagery through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing panoramic imagery, the method comprising:
    obtaining, by one or more processors, first panoramic imagery depicting a geographic area at a first time;
    obtaining, by the one or more processors, an image depicting at least a portion of the geographic area at a second time later than the first time, the image further depicting one or more features not depicted in the first panoramic imagery; and
    transforming, by the one or more processors and using a machine learning model, the first panoramic imagery into second panoramic imagery depicting the one or more features and including at least a portion of the first panoramic imagery.

2. The method of claim 1, wherein using the machine learning model includes:
    applying a generator network of a generative adversarial network (GAN), the GAN including the generator network and a discriminator network, to the first panoramic imagery and the image to:
        extract the one or more features from the image; and
        merge the one or more features into the first panoramic imagery to generate the second panoramic imagery.

3. The method of claim 2, wherein transforming the first panoramic imagery includes:
    applying the discriminator network to the second panoramic imagery to classify the second panoramic imagery as real or generated;
    if the discriminator network classifies the second panoramic imagery as generated, applying the generator network to the first panoramic imagery and the image to generate third panoramic imagery depicting the one or more features.

4. The method of claim 2, further comprising:
    training the generator network using a plurality of training panoramic images and a plurality of training images to extract features from the plurality of training images and merge the features into the plurality of training panoramic images; and
    training the discriminator network using the plurality of training panoramic images and a plurality of generated panoramic images generated by the generator network to classify the plurality of generated panoramic images as generated or real, wherein training the generator network further includes training the generator network using classifications from the discriminator network.

5. The method of claim 2, wherein transforming the first panoramic imagery further includes:
    applying the generator network to the first panoramic imagery to insert one or more patterns indicative of a weather condition into the first panoramic imagery, the one or more patterns absent from the first panoramic imagery.

6. The method of claim 5, further comprising:
    training the generator network using a plurality of training panoramic images and a plurality of training images to identify the one or more patterns indicative of the weather condition and to insert the one or more patterns into the first panoramic imagery.

7. The method of claim 2, wherein transforming the first panoramic imagery includes:
    applying the generator network to the first panoramic imagery to insert one or more light conditions indicative of a first amount of daylight into the first panoramic imagery, the first amount of daylight different from a second amount of daylight depicted in the first panoramic imagery.

8. The method of claim 7, further comprising:
    training the generator network using a plurality of training panoramic images and a plurality of training images to identify the one or more light conditions and to insert the one or more light conditions into the first panoramic imagery.

9. The method of claim 1, wherein the image is a non-panoramic image, and wherein transforming the first panoramic imagery includes:
    extracting the one or more features from the non-panoramic image;
    identifying a projection type of the first panoramic imagery;
    mapping the one or more physical objects to a coordinate system of the projection type; and
    merging the mapped one or more features into the first panoramic imagery to generate the second panoramic imagery.

10. The method of claim 1, wherein the image depicts at least a portion of the geographic area, and wherein transforming the first panoramic imagery includes:
    comparing the first panoramic imagery and the image to identify the one or more features absent from the first panoramic imagery.

11. The method of claim 1, wherein the machine learning model is trained to identify a plurality of predetermined objects;
    identifying, based on the application of the machine learning model, that the image includes a predetermined object of the plurality of predetermined objects that is not present in the first panoramic imagery; and
    merging the predetermined object into the first panoramic imagery.

12. A system for providing panoramic imagery, the system comprising:
    one or more processors; and
    a non-transitory memory storing instructions that, when executed by the one or more processors, cause the system to:

obtain first panoramic imagery depicting a geographic area at a first time, obtain an image depicting at least a portion of the geographic area at a second time later than the first time, the image further depicting one or more features not depicted in the first panoramic imagery, and transform, using a machine learning model, the first panoramic imagery into second panoramic imagery depicting the one or more features and including at least a portion of the first panoramic imagery.

13. The system of claim 12, wherein to use the machine learning model, the instructions cause the system to:

apply a generator network of a generative adversarial network (GAN), the GAN including the generator network and a discriminator network, to the first panoramic imagery and the image to:

extract the one or more features from the image, and merge the one or more features into the first panoramic imagery to generate the second panoramic imagery.

14. The system of claim 13, wherein to transform the first panoramic imagery, the instructions cause the system to:

apply the discriminator network to the second panoramic imagery to classify the second panoramic imagery as real or generated, if the discriminator network classifies the second panoramic imagery as generated, apply the generator network to the first panoramic imagery and the image to generate third panoramic imagery depicting the one or more features.

15. The system of claim 13, wherein the instructions further cause the system to:

train the generator network using a plurality of training panoramic images and a plurality of training images to extract features from the plurality of training images and merge the features into the plurality of training panoramic images; and train the discriminator network using the plurality of training panoramic images and a plurality of generated panoramic images generated by the generator network to classify the plurality of generated panoramic images as generated or real, wherein training the generator network further includes training the generator network using classifications from the discriminator network.

16. The system of claim 13, wherein to transform the first panoramic imagery, the instructions further cause the system to:

apply the generator network to the first panoramic imagery to insert one or more patterns indicative of a weather condition into the first panoramic imagery, the one or more patterns absent from the first panoramic imagery.

17. The system of claim 16, wherein the instructions further cause the system to:

train the generator network using a plurality of training panoramic images and a plurality of training images to identify the one or more patterns indicative of the weather condition and to insert the one or more patterns into the first panoramic imagery.

18. The system of claim 13, wherein to transform the first panoramic imagery, the instructions cause the system to:

apply the generator network to the first panoramic imagery to insert one or more light conditions indicative of a first amount of daylight into the first panoramic imagery, the first amount of daylight different from a second amount of daylight depicted in the first panoramic imagery.

19. The system of claim 18, wherein the instructions further cause the system to:

train the generator network using a plurality of training panoramic images and a plurality of training images to identify the one or more light conditions and to insert the one or more light conditions into the first panoramic imagery.

20. The system of claim 12, wherein the image is a non-panoramic image, and wherein to transform the first panoramic imagery, the instructions cause the system to:

extract the one or more features from the non-panoramic image;

identify a projection type of the first panoramic imagery;

map the one or more physical objects to a coordinate system of the projection type; and merge the mapped one or more features into the first panoramic imagery to generate the second panoramic imagery.

* * * * *